(12) United States Patent
Velamakanni et al.

(10) Patent No.: US 12,544,190 B2
(45) Date of Patent: Feb. 10, 2026

(54) DENTAL APPLIANCE WITH FUNCTIONAL STRUCTURES AND TRANSFER ARTICLES USED IN FORMING SUCH APPLIANCES

(71) Applicant: Solventum Intellectual Properties Company, Maplewood, MN (US)

(72) Inventors: Bhaskar V. Velamakanni, Woodbury, MN (US); Kevin W. Gotrik, Hudson, WI (US); Kevin T. Reddy, Minneapolis, MN (US); Scott J. Jones, Woodbury, MN (US); Matthew S. Stay, Bloomington, MN (US); Matthew R.D. Smith, Woodbury, MN (US); Yizhong Wang, Woodbury, MN (US); Mikhail L. Pekurovsky, Bloomington, MN (US); Narina Y. Stepanova, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 598 days.

(21) Appl. No.: 17/788,013

(22) PCT Filed: Dec. 29, 2020

(86) PCT No.: PCT/IB2020/062525
§ 371 (c)(1),
(2) Date: Jun. 22, 2022

(87) PCT Pub. No.: WO2021/137161
PCT Pub. Date: Jul. 8, 2021

(65) Prior Publication Data
US 2023/0049504 A1 Feb. 16, 2023

Related U.S. Application Data

(60) Provisional application No. 62/955,843, filed on Dec. 31, 2019, provisional application No. 62/955,268, filed on Dec. 30, 2019.

(51) Int. Cl.
*A61C 7/08* (2006.01)
*A61C 19/06* (2006.01)
(Continued)

(52) U.S. Cl.
CPC .............. *A61C 7/08* (2013.01); *A61C 19/063* (2013.01); *A61K 8/21* (2013.01); *A61Q 11/00* (2013.01);
(Continued)

(58) Field of Classification Search
CPC .......... A61C 7/08; A61C 19/063; A61K 8/21; A61Q 11/00
See application file for complete search history.

(56) References Cited

U.S. PATENT DOCUMENTS 6,267,782 B1   7/2001   Ogle et al.
7,018,713 B2   3/2006   Padiyath et al.
(Continued)

FOREIGN PATENT DOCUMENTS

GB   2529517 A   2/2016
JP   2014205247   10/2014
(Continued)

OTHER PUBLICATIONS

Buschang, "Incidence of white spot lesions among patients treated with clear aligners and traditional braces", Angle Orthodontist, May 1, 2019, vol. 89, No. 3, pp. 359-364.
(Continued)

*Primary Examiner* — Gerard Higgins

(57) ABSTRACT

A transfer article includes an acrylate layer releasable from a release layer including a metal layer, a metal oxide layer, or a doped semiconductor layer at a release value of from 2 to 50 grams/inch (0.8 to 20 g/cm). A functional layer overlies the acrylate layer, wherein the functional layer includes at least one layer of a functional material selected to provide at
(Continued)

least one of a therapeutic, aesthetic or cosmetic benefit on a dental appliance in a mouth of a patient, and wherein the transfer article has a thickness of less than 3 micrometers. A pattern of a transfer material is on a major surface of the functional layer, wherein the transfer material includes an adhesion modifying material chosen from release materials and adhesives.

7 Claims, 11 Drawing Sheets

(51) Int. Cl.
- *A61K 8/21* (2006.01)
- *A61Q 11/00* (2006.01)
- *B32B 7/06* (2019.01)
- *B32B 27/08* (2006.01)
- *B32B 27/30* (2006.01)

(52) U.S. Cl.
CPC ............ *B32B 7/06* (2013.01); *B32B 27/08* (2013.01); *B32B 27/308* (2013.01); *B32B 2255/10* (2013.01); *B32B 2255/20* (2013.01); *B32B 2255/205* (2013.01); *B32B 2535/00* (2013.01)

(56) References Cited

U.S. PATENT DOCUMENTS

| | | | |
|---|---|---|---|
| 7,905,724 B2 | 3/2011 | Kuo et al. | |
| 8,569,396 B1 | 10/2013 | Sloan | |
| 8,658,248 B2 | 2/2014 | Anderson et al. | |
| 8,978,659 B2 | 3/2015 | Bardach et al. | |
| 9,452,242 B2 | 9/2016 | Dehnad et al. | |
| 9,688,063 B2 | 6/2017 | Muller | |
| 9,827,790 B1 | 11/2017 | Moore et al. | |
| 9,862,124 B2 | 1/2018 | Radcliffe et al. | |
| 2005/0101213 A1 | 5/2005 | Foss et al. | |
| 2008/0299507 A1* | 12/2008 | Li | A61C 7/08 433/24 |
| 2016/0164013 A1 | 6/2016 | Lee et al. | |
| 2017/0007386 A1* | 1/2017 | Mason | G06Q 30/0643 |
| 2017/0008333 A1* | 1/2017 | Mason | B44C 1/228 |
| 2017/0209345 A1* | 7/2017 | Hasegawa | A61C 13/00 |
| 2018/0279606 A1 | 10/2018 | Yamashita et al. | |
| 2023/0013219 A1* | 1/2023 | Velamakanni | B33Y 10/00 |

FOREIGN PATENT DOCUMENTS

| | | |
|---|---|---|
| WO | 2000041893 A1 | 7/2000 |
| WO | 2000069382 A1 | 11/2000 |
| WO | 2016003342 A1 | 1/2016 |
| WO | 2017006178 A1 | 1/2017 |
| WO | 2017083482 A1 | 5/2017 |
| WO | 2017106239 A1 | 6/2017 |
| WO | 2018178802 A1 | 10/2018 |
| WO | 2018178803 A1 | 10/2018 |
| WO | 2021137159 A1 | 7/2021 |

OTHER PUBLICATIONS

International Search Report for PCT International Application No. PCT/IB2020/062525, mailed on Jun. 11, 2021. 6 pages.

Partial International Search for PCT International Application No. PCT/IB2020/062525, mailed on Apr. 15, 2021, 9 pages.

Sundararaj, "Critical evaluation of incidence and prevalence of white spot lesions during fixed orthodontic appliance treatment: A meta-analysis", Journal of International Society of Preventive and Community Dentistry, Nov.-Dec. 2015, vol. 5, No. 6, pp. 433-439.

* cited by examiner

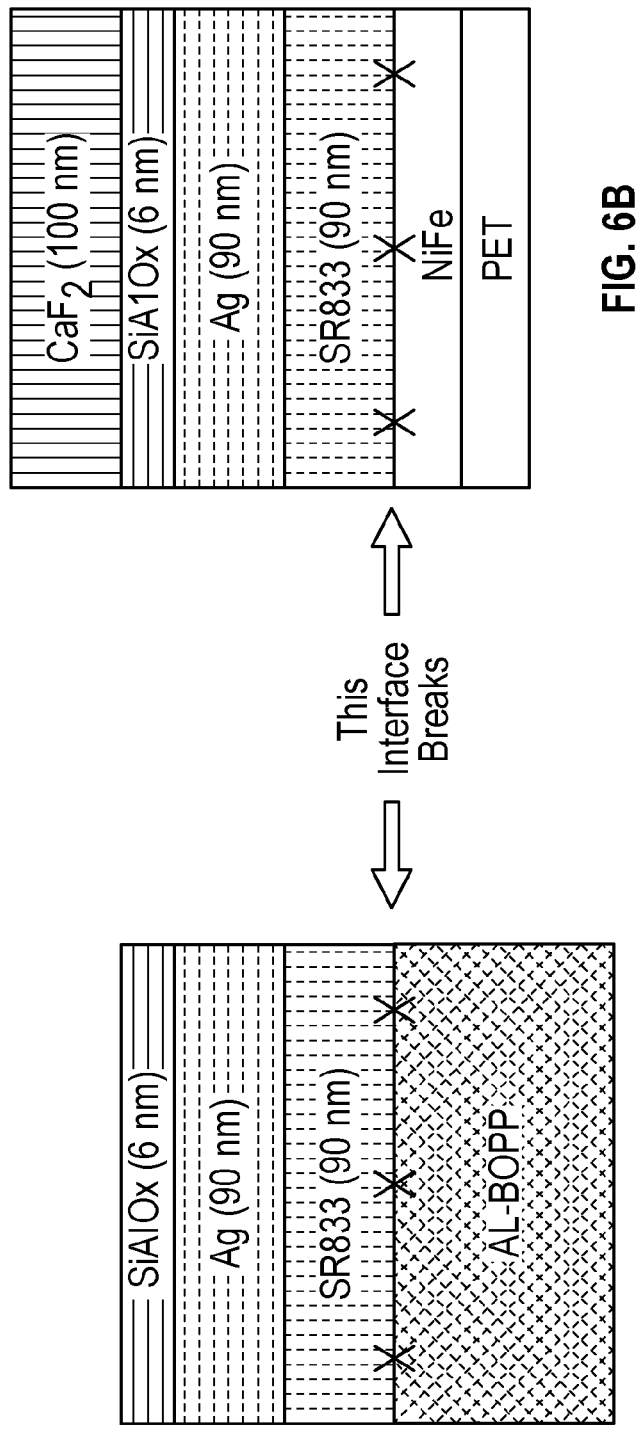

DENTAL APPLIANCE WITH FUNCTIONAL STRUCTURES AND TRANSFER ARTICLES USED IN FORMING SUCH APPLIANCES

CROSS REFERENCE TO RELATED APPLICATIONS

This application is a national stage filing under 35 U.S.C. 371 of PCT/IB2020/062525, filed 29 Dec. 2020, which claims the benefit of U.S. Provisional Application No. 62/955,268, filed 30 Dec. 2019, and U.S. Provisional Application No. 62/955,843, filed 31 Dec. 2019, the disclosures of which are incorporated by reference in their entireties herein.

BACKGROUND

Orthodontic treatments reposition misaligned teeth and improve bite configurations for improved cosmetic appearance and dental function. Teeth are repositioned by applying controlled forces to the teeth over an extended time period. In one example, teeth may be repositioned by placing a dental appliance, generally referred to as an orthodontic aligner or an orthodontic aligner tray, over the teeth of the patient for each treatment stage of an orthodontic treatment. The orthodontic alignment tray includes a polymeric shell defining a plurality of cavities for receiving one or more teeth. The individual cavities in the polymeric shell are shaped to exert force on one or more teeth to resiliently and incrementally reposition selected teeth or groups of teeth in the upper or lower jaw.

A series of orthodontic aligner trays are provided to a patient to be worn sequentially and alternatingly during each stage of the orthodontic treatment to gradually reposition teeth from one tooth arrangement to a successive tooth arrangement to achieve a desired tooth alignment condition. Once the desired alignment condition is achieved, an aligner tray, or a series of aligner trays, may be used periodically or continuously in the mouth of the patient to maintain tooth alignment. In addition, orthodontic retainer trays may be used for an extended time period to maintain tooth alignment following the initial orthodontic treatment.

In some examples, a stage of orthodontic treatment may require that an aligner tray remain in the mouth of the patient for several hours a day, over an extended time period of days, weeks or even months. While the orthodontic aligner tray is in use in the mouth of the patient, foods or other substances can stain or otherwise damage the appliance. In addition, microorganisms can contaminate the surface of the appliance, which in some cases can also cause biofilms to form on the surface. The biofilms can be difficult to remove, even if the appliance is periodically cleaned. Microorganisms or biofilm buildup on the surface of the aligner tray can stain or otherwise discolor the aligner tray, can cause undesirable tastes and odors, and even potentially lead to various periodontal diseases.

SUMMARY

In general, the present disclosure is directed to dental appliances including a surface with a pattern of discrete functional structures. In some embodiments, the discrete functional structures can include optical functionality to provide a selected color on the dental appliance, provide a selected level of light transmission through the dental appliance, or provide an aesthetic appearance for the dental appliance. In other embodiments, the discrete functional structures can provide bacterial resistant functionality on the dental appliance, or can provide therapeutic oral health functionality to, for example, protect teeth against decalcification, prevent biofilm formation, prevent formation of cavities, promote wound healing; reduce friction of the dental appliance against the teeth or in the oral cavity; alter or change the direction of forces applied to the teeth by the dental appliance, and the like.

In some embodiments, the patterning methods of present disclosure used to form the discrete functional structures on the dental appliance utilize a transfer article including a functional layer. The functional layer includes at least one layer of a material such as, for example, a metal, a metal oxide, a phosphorous compound, a fluoride compound, and the like, selected to provide at least one of a therapeutic benefit when used on a dental appliance in a mouth of a patient, or an aesthetic or cosmetic effect on the dental appliance. Selected patterned regions of the functional layer release from the transfer article and transfer to a target polymeric film substrate, which may subsequently be formed into the dental appliance. The patterned regions of the functional layer include distinct functional structures on a surface of the dental appliance to provide a cosmetic, aesthetic, or therapeutic benefit thereon.

In one embodiment, the dental appliance is made using an indirect patterning method in which an adhesion modifying release material is printed on the functional layer of the transfer article to form thereon a first pattern of discrete transfer structures. A polymeric film substrate is contacted with the functional layer of the transfer article and contacts the transfer structures. The polymeric film substrate is then separated from the transfer article, and regions of the functional layer transfer to the polymeric film in areas unoccupied by the transfer structures, thus forming a second pattern of functional structures on the surface of the polymeric film substrate, wherein the second pattern is an inverse of the first pattern. The functionally structured polymeric film substrate may then be formed into a dental article including tooth-retaining cavities.

In another embodiment, the dental appliance is formed with a direct patterning method in which an adhesion modifying transfer material is printed on a surface of a polymeric film substrate to form a first pattern of discrete transfer structures thereon, and the transfer structures are contacted with the functional layer of the transfer article. The polymeric film substrate is then separated from the transfer article, and portions of the functional layer release from the transfer article and adhere to the transfer structures, forming a second pattern of functional structures on the surface of the polymeric film substrate, wherein the second pattern corresponds to the first pattern. The functionally structured polymeric film may then be formed into a dental article including tooth-retaining cavities.

In another embodiment, a polyvinyl alcohol (PVA) transfer material is printed on a surface of a first polymeric film to form a first pattern of transfer structures. At least one functional layer of a material selected to provide at least one of a therapeutic benefit when used on a dental appliance in a mouth of a patient, or an aesthetic or cosmetic effect on the dental appliance such as, for example, a bioactive metal or metal oxide, is applied over the surface of the first polymeric film, and overlies the transfer structures. A second polymeric film substrate is then applied to the functional layer to form a laminate construction. The first polymeric film substrate is then removed from the laminate construction, which transfers portions of the functional layer to the second polymeric film substrate in regions overlying the hardened transfer structures, forming on the surface of the second polymeric film substrate a second pattern of discrete functional structures, wherein the second pattern corresponds to the first pattern. The functionally structured polymeric film may then be formed into a dental article including tooth-retaining cavities.

After the polymeric film substrate is formed into the dental appliance using any of the methods described above, the discrete functional structures may be on an interior surface of the dental appliance adjacent to the teeth of a patient, or on an outwardly facing surface of the dental appliance facing away from the teeth, or both. In various embodiments, the discrete functional structures can provide an aesthetic benefit for the dental appliance, can provide a therapeutic benefit when the dental appliance is used in the mouth of a patient, or can be used to modify the force applied to the teeth of the patient such as, for example, to counteract viscoelastic creep/stretch, which can enhance the effectiveness of a particular treatment protocol and improve patient comfort.

In one aspect, the present disclosure is directed to a transfer article that includes an acrylate layer releasable from a release layer including a metal layer, a metal oxide layer, or a doped semiconductor layer at a release value of from 2 to 50 grams/inch (0.8 to 20 g/cm). A functional layer overlies the acrylate layer, wherein the functional layer includes at least one layer of a functional material selected to provide at least one of a therapeutic, aesthetic or cosmetic benefit on a dental appliance in a mouth of a patient, and wherein the transfer article has a thickness of less than 3 micrometers. A pattern of a transfer material is on a major surface of the functional layer, wherein the transfer material includes an adhesion modifying material chosen from release materials and adhesives.

In another aspect, the present disclosure is directed to a transfer article including a substrate having a major surface with a pattern of discrete transfer structures thereon, wherein the transfer structures include polyvinyl alcohol (PVA); and a functional layer overlaying the transfer structures, wherein the functional layer includes at least one layer of a bioactive metal or a bioactive metal oxide.

In another aspect, the present disclosure is directed to a method for making a dental appliance configured to position at least one tooth of a patient. The method includes depositing an adhesion modifying composition on a major surface of a polymeric film to form a first pattern of discrete transfer structures thereon; providing a transfer article including a functional layer and an acrylate layer underlying the functional layer, wherein the acrylate layer on the transfer article is releasable from a release layer including a metal layer, a metal oxide layer, or a doped semiconductor layer at a release value of from 2 to 50 grams/inch (0.8 to 20 g/cm), and wherein the transfer article has a thickness of less than 3 micrometers; contacting the polymeric film with the functional layer of the transfer article such that the transfer structures contact the functional layer; separating the acrylate layer of the transfer article from the release layer thereof to transfer the functional layer and the acrylate layer from the transfer article onto the transfer structures to form a second pattern of discrete functional structures on the first major surface of the polymeric material and create a formable article, wherein the second pattern corresponds to the first pattern; and forming a plurality of cavities in the formable article to create the dental appliance including a plurality of cavities are configured to receive one or more teeth.

In another aspect, the present disclosure is directed to a method for making a dental appliance configured to position at least one tooth of a patient, the method including depositing an adhesion modifying composition on a major surface of a polymeric film to form a first pattern of discrete transfer structures thereon; providing a transfer article including a functional layer and an acrylate layer underlying the functional layer, wherein the acrylate layer on the transfer article is releasable from a release layer including a metal layer, a metal oxide layer, or a doped semiconductor layer at a release value of from 2 to 50 grams/inch (0.8 to 20 g/cm), and wherein the transfer article has a thickness of less than 3 micrometers; contacting the polymeric film with the functional layer of the transfer article such that the transfer structures contact the functional layer; separating the acrylate layer of the transfer article from the release layer thereof to transfer the functional layer and the acrylate layer from the transfer article onto the transfer structures to form a second pattern of discrete functional structures on the first major surface of the polymeric material and create a formable article, wherein the second pattern corresponds to the first pattern; and forming a plurality of cavities in the formable article to create the dental appliance comprising a plurality of cavities are configured to receive one or more teeth.

In another aspect, the present disclosure is directed to a method for making a dental appliance configured to position at least one tooth of a patient, the method including depositing polyvinyl alcohol (PVA) on a major surface of a substrate to form a first pattern of discrete transfer structures thereon; applying a functional layer over the major surface of the substrate, wherein the functional layer contacts the transfer structures; applying a major surface of a polymeric film to the functional layer to form a laminate; removing the polymeric film from the laminate such that the transfer structures and portions of the functional layer overlying the transfer structures release from the substrate and transfer to the major surface of the polymeric film to create a formable article, wherein the major surface of the polymeric film comprises a second pattern of functional structures corresponding to the first pattern; and forming a plurality of tooth-retaining cavities in the formable article to form the dental appliance.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 6A-6B are schematic cross-sectional views of transfer articles used in the working examples below.

FIG. 7A shows structures with a 100 micron diameter, FIG. 7B shows structures with a 200 micron diameter, and FIG. 7C shows structures with a 300 micron diameter.

Like symbols in the drawings indicate like elements.

DETAILED DESCRIPTION

Figure 1:
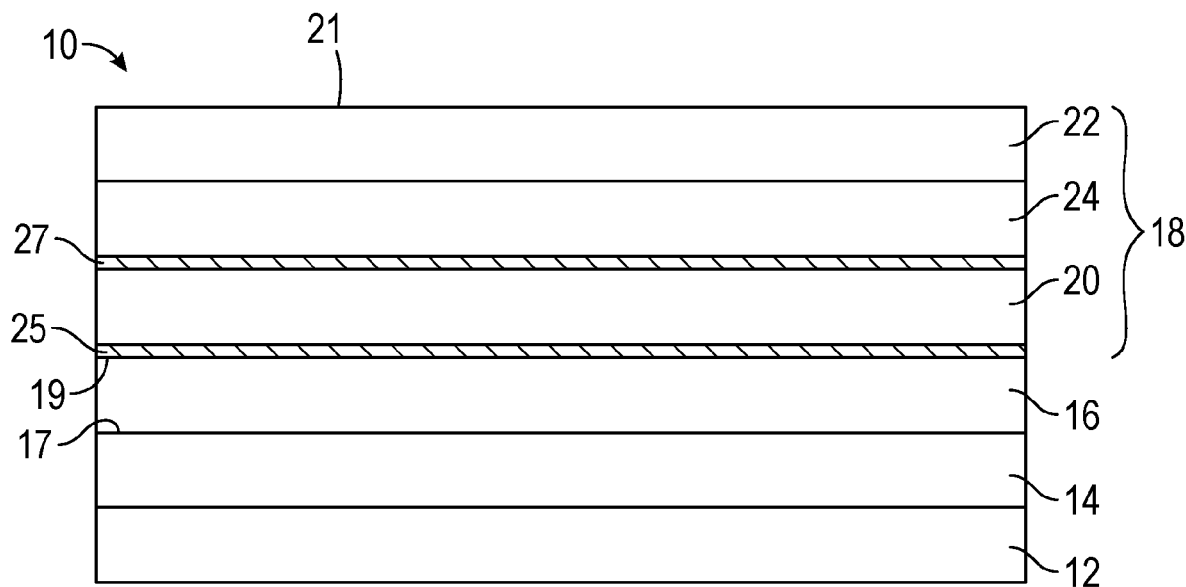
FIG. 1 is a schematic cross-sectional view of an embodiment of a transfer article according to the present disclosure.

Referring to FIG. 1, a transfer article 10 includes an optional release layer substrate 12 overlain with a release layer 14. A first acrylate layer 16 contacts the release layer 14 along a release surface 17. A functional layer 18 includes a first major surface 19 contacting the first acrylate layer 16. In various embodiments, the functional layer 18 can include a stack of one or more inorganic layers selected to provide at least one of an aesthetic, cosmetic, or therapeutic property on a dental appliance. For example, in some embodiments, the functional layer 18 can subsequently be patterned to form an image, a logo, a bar code or a QR code pattern; or may include a material selected to provide a reflective or transmissive property or a color. In some embodiments, the functional layer 18 can provide at least one therapeutic benefit in a mouth of a patient such as, for example, antimicrobial, anti-biofilm, friction-reducing, force-applying, anti-cavity, and combinations thereof.

In the embodiment of FIG. 1, the functional layer 18 further includes an optional second acrylate layer 24, which may be the same or different from the first acrylate layer 16. In the embodiment of FIG. 1, an optional adhesive layer 22 overlies the second acrylate layer 24 (if present). In some examples, the optional adhesive layer 22 may be used to attach the transfer article 10 to a surface of interest, or to another article (not shown in FIG. 1).

In various embodiments, the combination of the first acrylate layer 16 and the functional layer 18 has a thickness of less than about 3 micrometers, or less than 2 micrometers, or less than 1 micrometer, or less than 0.5 micrometers, or less than 0.25 micrometers, or less than 0.1 micrometers.

The optional release layer substrate 12 can include any material capable of supporting the release layer 14, and suitable examples include, but are not limited to, polymeric materials and metals. In some embodiments, the release layer substrate 12 can be mechanically removable, which may or may not lead to fracturing of the functional layer 18. In some embodiments, the release layer substrate 12 can be heat-shrinkable, and can shrink at a predetermined temperature. Suitable release layer substrates 12 can be chosen from any organic polymeric layer that is processed to be heat-shrinkable by any suitable means. In one embodiment, the release layer substrate 12 is a semicrystalline or amorphous polymer that can be made heat-shrinkable by orienting at a temperature above its glass transition temperature, Tg, and then cooling. Examples of useful semicrystalline polymeric films include, but are not limited to, polyolefins such as polyethylene (PE), polypropylene (PP), and syndiotactic polystyrene (sPS); polyesters such as polyethylene terephthalate (PET), polyethylene napthalate (PEN), and polyethylene-2,6-naphthalate; fluoropolymers such as polyvinylidene difluoride, and ethylene:tetrafluoroethylene copolymers (ETFE); polyamides such as Nylon 6 and Nylon 66; polyphenylene oxide, and polyphenylene sulfide. Examples of amorphous polymer films include polymethylmethacrylate (PMMA), polyimides (PI), polycarbonate (PC), polyether sulfone (PES), atactic polystyrene (aPS), polyvinyl chloride (PVC), polylactic acid (PLA), norbornene based cyclic olefin polymer (COP), and cyclic olefin copolymer (COC). Some polymer materials are available in both semicrystalline and amorphous forms. Semicrystalline polymers such as those listed above can also be made heat-shrinkable by heating to the peak crystallization temperature and cooling.

In some embodiments, biaxially or uniaxially oriented polyethylene terephthalate (PET) with a thickness of approximately 0.002 inch (0.05 mm) is considered a convenient choice for the release layer substrate 12, as is biaxially oriented polypropylene (BOPP) film. Biaxially oriented polypropylene (BOPP) is commercially available from several commercial suppliers including, for example: ExxonMobil Chemical Company, Houston, TX; Continental Polymers, Swindon, UK; Kaisers International Corporation of Taipei City, Taiwan and PT Indopoly Swakarsa Industry (ISI) of Jakarta, Indonesia.

The release layer 14 can include a metal layer, a metal oxide layer, or a doped semiconductor layer. In the embodiment shown in FIG. 1, the first acrylate layer 16 is in direct contact with the release layer 14 and the functional layer 18. In the embodiment shown in FIG. 1, the optional release layer substrate 12 is in direct contact with the release layer 14, but in other embodiments there can be additional layers between the release layer substrate 12 and the release layer 14 (not shown in FIG. 1).

In some embodiments, a release value between the release layer 14 and the first acrylate layer 16 along the release surface 17 is less than 50 g/inch (20 g/cm), 40 g/inch (16 g/cm), 30 g/inch (12 g/cm), 20 g/inch (8 g/cm), 15 g/inch (6 g/cm), 10 g/inch (4 g/cm), 9 g/inch (3.5 g/cm), 8 g/inch (3 g/cm), 7 g/inch (2.8 g/cm), 6 g/inch (2.4 g/cm), 5 g/inch (2 g/cm), 4 g/inch (1.6 g/cm) or 3 g/inch (1.2 g/cm). In some embodiments, the release value between the release layer 14 and the first acrylate layer 16 is more than 1 g/inch (0.4 g/cm), 2 g/inch (0.8 g/cm), 3 g/inch (1.2 g/cm) or 4 g/inch (1.6 g/cm). In some embodiments, the release value between the release layer 14 and the first acrylate layer 16 is from 1 to 50 g/inch (0.4 to 20 g/cm), from 1 to 40 g/inch (0.4 to 16 g/cm), b from 1 to 30 g/inch (0.4 to 12 g/cm), from 1 to 20 g/inch (0.4 to 8 g/cm), from 1 to 15 g/inch (0.4 to 6 g/cm), from 1 to 10 g/inch (0.4 to 4 g/cm), from 1 to 8 g/inch (0.4 to 3 g/cm) from 2 to 50 g/inch (0.8 to 20 g/cm), from 2 to 40 g/inch (0.8 to 16 g/cm), from 2 to 30 g/inch (0.8 to 12 g/cm), from 2 to 20 g/inch (0.8 to 8 g/cm), from 2 to 15 g/inch (0.8 to 6 g/cm), from 2 to 10 g/inch (0.8 to 4 g/cm), or from 2 to 8 g/inch (0.8 to 3 g/cm).

The transfer article 10 can be used to transfer the first acrylate layer 16 and the functional layer 18 thereon to another surface of interest such as, for example, a polymeric film substrate, so that the release layer 14 and/or the release layer substrate 12 can be reused. In one example, the transfer article 10 can be applied to a surface of interest with the functional layer 18 being between the first acrylate layer 16 and the surface of interest. After the transfer article 10 is applied to the surface of interest, the release layer 14 and the substrate 12, if present, can be removed from the transfer article 10. The first acrylate layer 16 and the functional layer 18 then remain on the surface of interest. In some embodiments, the optional adhesive layer 22 can help the functional layer 18 more effectively attach to the surface of interest.

In some embodiments, the release layer 14 can include a metal layer chosen from individual elemental metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof. In some embodiments, which are not intended to be limiting, the release layer 14 may conveniently be formed of Al, Zr, Cu, NiCr, NiFe, Ti, or Nb, and may have a thickness between about 3 nm and about 3000 nm.

In some embodiments, the release layer 14 can include a doped semiconductor layer. In some embodiments, which are not intended to be limiting, the doped semiconductor layer may conveniently be formed of Si, B-doped Si, Al-doped Si, P-doped Si with thicknesses between about 3 nm to about 3000 nm. A particularly suitable doped semiconductor layer for the release layer 14 is Al-doped Si, wherein the Al compositional percentage is about 10%.

In various example embodiments, the release layer 14 is prepared by evaporation, reactive evaporation, sputtering, reactive sputtering, chemical vapor deposition, plasma enhanced chemical vapor deposition, and atomic layer deposition.

The first and second acrylate layers 16, 24 in the transfer article 10 may be made from the same material or different materials. In some embodiments, the first acrylate layer 16 or the second acrylate layer 24 can include an acrylate or an acrylamide. When the acrylate layers are to be formed by flash evaporation of the monomer, vapor deposition, followed by crosslinking, volatilizable acrylate and methacrylate (referred to herein as "(meth)acrylate") or acrylamide or methacrylamide (referred to herein as "(meth)acrylamide") monomers are useful, with volatilizable acrylate monomers being preferred. In various embodiments, a suitable (meth) acrylate or (meth) acrylamide monomer has sufficient vapor pressure to be evaporated in an evaporator and condensed into a liquid or solid coating in a vapor coater, deposited as a spin-on coating, and the like.

Examples of suitable monomers include, but are not limited to, hexanediol diacrylate; ethoxyethyl acrylate; cyanoethyl (mono)acrylate; isobornyl (meth)acrylate; octadecyl acrylate; isodecyl acrylate; lauryl acrylate; beta-carboxyethyl acrylate; tetrahydrofurfuryl acrylate; dinitrile acrylate; pentafluorophenyl acrylate; nitrophenyl acrylate; 2-phenoxyethyl (meth)acrylate; 2,2,2-trifluoromethyl (meth)acrylate; diethylene glycol diacrylate; triethylene glycol di(meth)acrylate; tripropylene glycol diacrylate; tetraethylene glycol diacrylate; neo-pentyl glycol diacrylate; propoxylated neopentyl glycol diacrylate; polyethylene glycol diacrylate; tetraethylene glycol diacrylate; bisphenol A epoxy diacrylate; 1,6-hexanediol dimethacrylate; trimethylol propane triacrylate; ethoxylated trimethylol propane triacrylate; propylated trimethylol propane triacrylate; tris(2-hydroxyethyl)-isocyanurate triacrylate; pentaerythritol triacrylate; phenylthioethyl acrylate; naphthloxyethyl acrylate; neopentyl glycol diacrylate, MIRAMER M210 (available from Miwon Specialty Chemical Co., Ltd., Korea), KAYARAD R-604 (available from Nippon Kayaku Co., Ltd., Tokyo, Japan), epoxy acrylate under the product number RDX80094 (available from RadCure Corp., Fairfield, N.J.); and mixtures thereof. A variety of other curable materials can be included in the polymer layer, such as, e.g., vinyl ethers, vinyl napthalene, acrylonitrile, and mixtures thereof.

Tricyclodecane dimethanol diacrylate can be used as an acrylate material for any of the component layers in the functional layer, and in some embodiments may be applied by, e.g., condensed organic coating followed by UV, electron beam, or plasma initiated free radical polymerization. A thickness between about 10 nm and 10000 nm for the acrylate layers 16, 24 is considered convenient, with a thickness of about 10 nm and 5000 nm being considered particularly suitable. In some embodiments, the thickness of the acrylate layers 16, 24 can be between about 10 nm and 3000 nm. In some embodiments, the functional layer 18 includes at least one layer 20 of a functional material selected to provide a beneficial effect when provided on a surface of a dental appliance in a mouth of a patient. In various embodiments, which are not intended to be limiting, the functional layer 18 can include optical functionality (for example, the layer appears a certain way in its color/transmission/aesthetics), bacterial resistant functionality (for example, the layer kills certain types of bacteria), therapeutic oral health functionality (for example, the layer provides a potential for remineralization, cavity prevention, wound healing, friction reduction, force-application, and the like).

In one embodiment, the functional material includes a therapeutic agent, which includes, but is not limited to, fluoride sources, whitening agents, anti-caries agents (e.g., xylitol), re-mineralizing agents (e.g., calcium phosphate compounds), enzymes, breath fresheners, anesthetics, clotting agents, acid neutralizers and pH control agents, ion-recharging agents, chemotherapeutic agents, immune response modifiers, thixotropes, polyols, anti-inflammatory agents, antimicrobial agents, antifungal agents, agents for treating xerostomia, desensitizers, and the like, of the type often used in dental compositions. The functional layer 18 may include one or more layers of any of the above therapeutic agents, or individual layers including one or more of any of the above therapeutic agents.

In some example embodiments, suitable therapeutic agents for the functional layer 18 include re-mineralizing agents such as calcium, phosphorous, and fluoride compounds.

For example, in some embodiments, suitable calcium compounds include, but are not limited to, calcium chloride, calcium carbonate, calcium caseinate, calcium chloride, calcium citrate, calcium fluoride, calcium glubionate, calcium gluceptate, calcium glycerophosphate, calcium gluconate, calcium hydroxide, calcium hydroxyapatite, calcium lactate, calcium oxalate, calcium oxide, calcium pantothenate, calcium phosphate, calcium polycarbophil, calcium propionate, calcium pyrophosphate, calcium sulfate, and mixtures and combinations thereof. These compounds have been found to minimize demineralization of calcium hydroxyapatite at the surface of the tooth of a patient.

In some embodiments, the tooth re-mineralizing compounds include phosphate compounds. Suitable phosphate compounds include, but are not limited to, aluminum phosphate, bone phosphate, calcium phosphate, calcium orthophosphate, calcium phosphate dibasic anhydrous, calcium phosphate-bone ash, calcium phosphate dibasic dihydrate, calcium phosphate dibasic anhydrous, calcium phosphate dibasic dihydrate, calcium phosphate tribasic, dibasic calcium phosphate dihydrate, dicalcium phosphate, neutral calcium phosphate, precipitated calcium phosphate, tertiary calcium phosphate, tricalcium phosphate, whitlockite, magnesium phosphate, potassium phosphate, dibasic potassium phosphate, dipotassium hydrogen orthophosphate, dipotassium monophosphate, dipotassium phosphate, monobasic potassium phosphate, potassium acid phosphate, potassium biphosphate, potassium dihydrogen orthophosphate, potassium hydrogen phosphate, sodium phosphate, anhydrous sodium phosphate, dibasic sodium phosphate, disodium hydrogen orthophosphate, disodium hydrogen orthophosphate dodecahydrate, disodium hydrogen phosphate, disodium phosphate, and sodium orthophosphate.

Fluoride compounds incorporated into the mineral surface of a tooth help inhibit the demineralization of enamel and protect the tooth. Fluoride compounds absorbed into mineral surfaces of a tooth attract calcium and phosphate ions from saliva, or other sources, which results in the formation of fluorapatite and protects the tooth against demineralization. While not wishing to be bound by any theory, currently available evidence indicates that fluoroapatite exhibits lower solubility than naturally occurring hydroxyapatite, which can help resist the inevitable acid challenge that teeth face daily.

Orthodontic patients are considered high risk for cavities over the course of their treatment. Commercial fluoride varnishes are very sticky by design and typically last a few hours on the enamel once applied. For an orthodontic patient wearing a dental appliance such as an aligner tray, this is undesirable since the varnish can interfere with the fit of the aligners on the arches of the patient, as well as adhere to the plastic that the aligners are made from and permanently warp or deform them. In one embodiment, for example, the functional layer 18 can be configured to form discrete structures that deliver beneficial fluoride over a typical wear time for an alignment tray set (for example, 7 days), without compromising the fit of the alignment tray for the patient or ruining the polymeric material from which the alignment tray is made.

In some embodiments, the calcium compounds, phosphate compounds, fluoride compounds or combinations thereof, are present in the functional layer 18 on the transfer article in an amount sufficient such at least one of calcium, phosphate or fluoride can substantially reduce or prevent demineralization on the surface of the teeth of the patient during or exceeding a predetermined wear time.

In another embodiment, the therapeutic agents in the functional layer 18 include antimicrobial compounds. Suitable antibacterial or biofilm-reducing compounds include, but are not limited to, bioactive metals and metal oxides $MO_x$ such as silver, silver oxide, copper oxide, gold oxide, zinc oxide, magnesium oxide, titanium oxide, chromium oxide, and mixtures, alloys and combinations thereof.

The functional layer 18 can include any antimicrobially effective amount of the metal or the metal oxide $MO_x$. In various embodiments, which are not intended to be limiting, the functional layer 18 can include less than 100 mg, less than 40 mg, less than 20 mg, or less than 5 mg $MO_x$ per 100 cm². The metal oxide can include, but is not limited to, silver oxide, copper oxide, gold oxide, zinc oxide, magnesium oxide, titanium oxide, chromium oxide, and mixtures, alloys and combinations thereof. In some embodiments, which are not intended to be limiting, the metal oxide can be chosen from AgCuZnOx, Ag doped ZnOx, Ag doped AZO, Ag doped $TiO_2$, Al doped ZnO, and TiOx.

In some embodiments, the functional layer 18 can include one or more antibacterial agents. Examples of suitable antibacterial agents can include, but are not limited to, aldehydes (glutaraldehyde, phthalaldehyde), salts of phenolics or acids, chlorhexidine or its derivatives (including acid adducts such as acetates, gluconates, chlorides, nitrates, sulfates or carbonates), and combinations thereof.

Non-limiting examples of antibacterial agents include: zinc salts, zinc oxide, tin salts, tin oxide, benzalkonium chloride, hexitidine, long chain alkyl ammonium or pyridinium salts (e.g., cetypyridinium chloride, tetradecylpyridinium chloride), essential oils (e.g., thymol), furanones, chlorhexidine and salt forms thereof (e.g., chlorhexidine gluconate), sanguinarine, triclosan, stannous chloride, stannous fluoride, octenidine, non-ionic or ionic surfactants (e.g., quaternary ammonium compounds), alcohols (monomeric, polymeric, mono-alcohols, poly-alcohols), aromatic alcohols (e.g., phenol)), antimicrobial peptides (e.g., histatins), bactericins (e.g., nisin), antibiotics (e.g., tetracycline), aldehydes (e.g., glutaraldehyde) inorganic and organic acids (e.g., benzoic acid, salicylic acid, fatty acids, etc.) or their salts, derivatives of such acids such as esters (e.g., p-hydroxybenzoates or other parabens, glycerol esters of fatty acids such as lauricidin), silver compounds, silver salts, silver nanoparticles, peroxides (e.g., hydrogen peroxide), and combinations thereof.

In various embodiments, the functional materials in the functional layer 18 can vary widely within a single layer or between multiple layers. For example, the therapeutic agents released by a first layer within the functional layer 18 can be different from the therapeutic agents released a second layer within the functional layer 18, e.g., fluoride in the first layer and phosphate in the second layer. In other examples, the therapeutic agents released a single layer in the functional layer 18 can differ from one another. In another embodiment, the therapeutic agents within a layer of the functional layer 18 can be released at a different concentration, at different concentrations between individual layers.

For example, the therapeutic agents released from the functional structures formed on the dental appliance from the functional layer 18 can be releasable over a predetermined patient wear time. In some examples, the therapeutic agents may be released over a period of seconds, minutes, hours, days, weeks, or months. In addition, different regions of the orthodontic appliance can have therapeutic agents with varying predetermined release periods. For example, one region may have a release period on the order of seconds, and another different region may have a release period on the order of months.

In another embodiment, the functional structures formed from the functional layer 18 can be configured to absorb and release therapeutic agents. For example, calcium and/or phosphorus can be absorbed from saliva and released over time. In another example, fluoride, calcium, tin, and/or phosphorus can be absorbed from oral care products (e.g., toothpaste and rinse) and released over time.

In another embodiment, the functional layer 18 can include an elastomeric polymeric material selected to, for example, form discrete functional structures on a surface of the dental appliance that ease placement and removal of the dental appliance in the mouth of the patient, improve comfort against the teeth or the tissues in the mouth of the patient, or enhance tray-to-dentition contact area leading to lower stress and/or effective force transfer from a dental article for repositioning teeth. In some examples, suitable elastomers for the functional layer 18 can include polyisoprenes, polybutadienes, chloroprene rubbers, butyl rubbers, halogenated butyl rubbers, fluoropolymers, nitriles, ethylene propylene rubbers, ethylene propylene diene rubbers, silicone rubbers, polyacrylic rubbers, fluorosilicones, fluoroelastomers, polyether block amides, chlorosulfinated polyethylenes, and ethylene vinyl acetates.

In another embodiment, the functional layer 18 can be configured to facilitate to form functional structures on a surface of a dental appliance that allow unhindered flow of salivary fluids and other fluids to enhance and/or maintain hard tissue health. For example, when a tooth surface undergoes demineralization instigated by oral bacteria, dietary choices, xerostomia, etc., the functional structures formed from the functional layer 18 can provide open channels for the saliva to re-mineralize and hydrate the tooth surface.

In some embodiments, the functional layer 18 can provide functional structures on a surface of a dental appliance that have reflective, anti-reflective, partially absorbing, polarizing, retarding, diffractive, scattering, or transmissive properties over at least one electromagnetic wavelength of interest. For example, the functional structures formed from the functional layer 18 can include at least one or a plurality of inorganic layers, which in various embodiments include metal layers and metal oxide layers, which may have the same or different thicknesses and indices of refraction chosen to provide a predetermined optical effect over the electromagnetic wavelengths of interest.

In various embodiments, the functional layer 18 has a thickness of less than about 5 microns, or less than about 2 microns, or less than about 1 micron, or less than about 0.5 microns.

In various embodiments, which are not intended to be limiting, the functional layer 18 can include a layer of a metal chosen from individual elemental metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof. In some embodiments, which are not intended to be limiting, the inorganic layer 20 is chosen from Ag, Al, Ge, Au, Si, Ni, Cr, Co, Fe, Nb, and mixtures, alloys and oxides thereof. In some embodiments, the inorganic layer 20 of the functional layer 18 includes layers of metal oxides such as, for example, AgOx, SiAlOx, NbOx, and mixtures and combinations thereof, which are interspersed with the metal layers.

In some embodiments, the inorganic layer or layers in the functional layer 18 are applied by sputtering, evaporation, or flash evaporation, and a thickness between about 3 and about 200 nm, or about 3 to about 100 nm, or about 3 nm to about 50 nm, or about 3 nm to about 20 nm, or about 3 nm to about 15 nm, or about 3 nm to about 10 nm, or about 3 nm to about 5 nm.

In some embodiments, the functional layer 18 includes a stack of a plurality of metal layers, wherein at least some of the metal layers in the stack are separated by metal oxide layers, polymeric layers, or mixtures and combinations thereof. In various embodiments, each metal layer in the stack can have substantially the same thickness, or the metal layers in the stack can have different thicknesses. In some embodiments, which are not intended to be limiting, each inorganic layer in the plurality of inorganic layers has a thickness of about 5 nm to about 100 nm. In various embodiments, the stack of inorganic layers can include about 2 to about 100 layers, or about 2 to 10, or about 2 to 5. In one non-limiting example, the stack of inorganic layers includes AgOx and SiOx layers, which in some cases can be arranged in an alternating fashion. In some embodiments, the SiOx layers include SiAlOx layers. In some embodiments, the stack of inorganic layers includes a layer of AgOx and a layer of SiAlOx.

In one example embodiment, the functional layer 18 includes a plurality of inorganic layers, including metal or metal oxide layers, which may be the same elemental composition or different elemental compositions, and may have the same or different thicknesses, separated by acrylate layers. In some embodiments, the acrylate layers in the functional layer 18 may be the same elemental composition or may have an elemental composition different from that of the first acrylate layer 16 and the second acrylate layer 24 in the transfer article. In various embodiments, the acrylate layers in the functional layer 18 may have the same or different thicknesses as the first acrylate layer 16 and the second acrylate layer 24.

In some embodiments, the functional layer 18 can include one or more optional barrier layers 25, 27 along the major surfaces 19, 21 thereof as shown schematically in FIG. 1, or on exposed surfaces of the inorganic layer 20, or both. The one or more barrier layers 25, 27 may include individual elemental metals, two or more metals as mixtures, inter-metallics or alloys, semi-metal or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof.

In some embodiments, the barrier layers 25, 27 may be chosen from metal oxides, metal nitrides, metal oxy-nitrides, and metal alloys of oxides, nitrides and oxy-nitrides. In some embodiments, the barrier layers 15, 27 may include a metal oxide chosen from silicon oxides such as silica, aluminum oxides such as alumina, titanium oxides such as titania, indium oxides, tin oxides, indium tin oxide (ITO), hafnium oxide, tantalum oxide, zirconium oxide, zinc oxide, niobium oxide, and combinations thereof. In some embodiments, the metal oxides for the barrier layers 25, 27 may include aluminum oxide, silicon oxide, silicon aluminum oxide, aluminum-silicon-nitride, and aluminum-silicon-oxynitride, CuO, $TiO_2$, ITO, ZnO, aluminum zinc oxide, $ZrO_2$, and yttria-stabilized zirconia. Preferred nitrides may include $Si_3N_4$ and TiN.

In some example embodiments, the barrier layers 25, 27 can typically be prepared by reactive evaporation, reactive sputtering, chemical vapor deposition, plasma enhanced chemical vapor deposition, and atomic layer deposition. Preferred methods include vacuum preparations such as reactive sputtering and plasma enhanced chemical vapor deposition, and atomic layer deposition.

The barrier layers 25, 27 can be conveniently applied as a thin layer. The barrier layer material, e.g., silicon aluminum oxide, can for example, provide good barrier properties, as well as good interfacial adhesion to acrylate layers. Such layers are conveniently applied by sputtering, and a thickness between about 3 and 100 nm is considered convenient, with approximately 27 nm in thickness being considered particularly suitable. In some embodiments, the barrier layer may have a water vapor transmission rate of less than 0.2, 0.1, 0.05, 0.01, 0.005 or 0.001 g/m$^2$/day, thus providing good environmental resistance for the inorganic layer 20.

The optional adhesive layer 22 on the transfer article 10 can include a viscoelastic or elastomeric adhesive with a low modulus of 50 MPa to about 1000 MPa, or about 100 MPa to about 500 MPa. Suitable viscoelastic or elastomeric adhesives can include those described in U.S. Pat. No. 9,862,124 (Radcliffe et al.), for example, pressure-sensitive adhesives (PSAs), rubber-based adhesives (e.g., rubber, urethane) and silicone-based adhesives. Viscoelastic or elastomeric adhesives also include heat-activated adhesives which are non-tacky at room temperature but become temporarily tacky and are capable of bonding to a substrate at elevated temperatures. Heat activated adhesives are activated at an activation temperature and above this temperature have similar viscoelastic characteristics as PSAs. Viscoelastic or elastomeric adhesives may be substantially transparent and optically clear.

Any of the viscoelastic or elastomeric adhesives 22 may be viscoelastic optically clear adhesives. Elastomeric materials may have an elongation at break of greater than about 20 percent, or greater than about 50 percent, or greater than about 100 percent.

The viscoelastic or elastomeric adhesive layers 22 may be applied directly as a substantially 100 percent solids adhesive or may be formed by coating a solvent-borne adhesive and evaporating the solvent. Viscoelastic or elastomeric adhesives may be hot melt adhesives which may be melted, applied in the melted form and then cooled to form a viscoelastic or elastomeric adhesive layer. Suitable viscoelastic or elastomeric adhesives include elastomeric polyurethane or silicone adhesives and the viscoelastic optically clear adhesives CEF22, 817x, and 818x, all available from 3M Company, St. Paul, MN. Other useful viscoelastic or elastomeric adhesives include PSAs based on styrene block copolymers, (meth)acrylic block copolymers, polyvinyl ethers, polyolefins, and poly(meth)acrylates. In some embodiments, the adhesive layer 22 can include a UV cured adhesive.

Figure 2A:
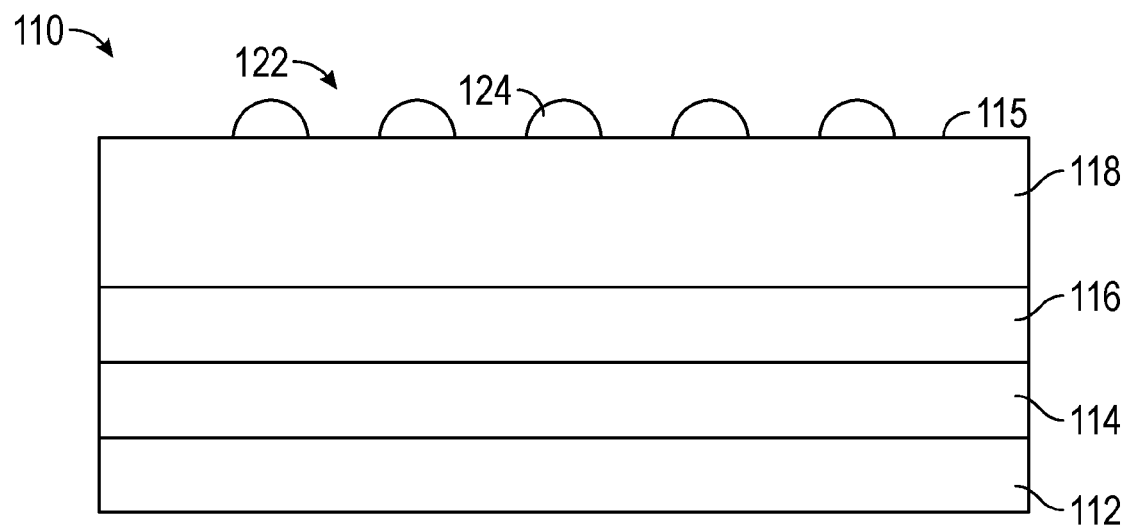
FIGS. 2A-2D are a schematic cross-sectional views of the steps of an indirect printing process for making structures on a substrate that can be formed into a dental appliance.

Referring now to FIG. 2A, a hardenable liquid release composition is printed on a major surface 115 of a functional layer 118 of a transfer article 110 using any suitable printing process. As shown in FIG. 1, the transfer article includes an acrylate layer 116, a release layer 114, and a substrate 112. In the embodiment of FIG. 2A, the liquid release composition is printed in discrete regions 124 to form a first pixelated pattern 122, but in an alternative embodiment (not shown in FIG. 2A) may be printed as a continuous layer on the major surface 115. In the present application the term discrete refers to individual liquid regions of the hardenable liquid release composition that are free-standing, separate and distinct from one another, and do not share an edge-to-edge border.

The printing processes used to form the discrete regions 124 may vary widely, and in one example, which is not intended to be limiting, includes screen printing in which a mesh is used to transfer a liquid composition, sometimes referred to as an ink, onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed. One color is printed at a time, so several screens can be used to produce a multi-colored image or design. Screen printing is particularly useful in forming liquid regions 124 with varying heights or spacings above the surface 115. For example, in some embodiments the spacing of apertures in the screen, or the thickness of the screen, or both, can be varied to form arrays of liquid regions with corresponding spacings or heights above the surface 115.

Another suitable printing process is flexographic printing, in which printing ink is transferred to the image areas of the flexographic plate via an anilox roll (composed of cells filled with ink, usually by a blading ink into the anilox roll cells), and then the ink is transferred to the substrate by contacting the "inked" flexographic plate to the substrate. Ink is only transferred from the relief features of the flexographic plate to the substrate.

In various embodiments, which are not intended to be limiting, the liquid regions 124 of the liquid release composition are made from adhesion-modifying materials. A wide range of adhesives are suitable, and suitable adhesives include, but are not limited to, those available from 3M, St. Paul, MN, under the trade designation SCOTCHBOND UNIVERSAL ADHESIVE. The adhesion-modifying materials can also include release materials such as, for example, silicones, fluorinated compounds, radiation curable inks available from Flint Group, Rogers, MN, polyvinyl alcohol (PVA), and the like.

In some embodiments, the major surface 115 of the functional layer 118 may optionally be chemically or mechanically treated prior to applying the hardenable liquid transfer composition to, for example, enhance adhesion between the surface 115 and the regions 124. Examples of suitable treatments include, but are not limited to, corona treatments, ozonation, application of silane coupling agents, application of primers, application of adhesives, and combinations thereof.

In various embodiments, the discrete regions 124 of the hardenable liquid release material may form a continuous or a discontinuous array, or both, over the surface 115. For example, some areas of the surface 115 may be free of the liquid regions 124, while other areas have a dense arrangement of liquid regions 124. In another example embodiment, various areas of the surface 115 may have liquid regions 124 with varying shapes and feature spacings. The sizes and shapes of the liquid regions 124 can vary widely, and the liquid regions 124 need not be the same size or shape in a particular area of the surface 115, or over the entire surface 115. For example, in some embodiments, the liquid regions 124 can form an aesthetic pattern, an image, a logo, a bar code or a QR code, and the like. In other embodiments, the liquid regions 124 form an array of dots over all or a portion of the surface 115.

In some embodiments, the liquid regions 124 are be applied on the surface 115 such that the resulting pattern transferred to a polymeric substrate 130 (discussed below in reference to FIG. 2B) is highly transmissive to visible light. In some cases, to accomplish this objective, the liquid regions 124 are densely applied on the surface 115. For example, various embodiments the liquid regions 124 are applied on the surface 115 with sizes and feature spacings such that the visible light transmission through the polymeric substrate 130 is at least about 50%, or about 75%, or about 85%, or about 90%, about 95%, about 98%, or about 99%.

In various embodiments, areas of the surface 115 may include liquid regions 124 of differing sizes, shapes or compositions, and in some embodiments, two or more different configurations of the liquid regions 124 can be deposited uniformly or randomly on at least a portion of the surface 115. For example, liquid regions 124 with a first shape or size can be disposed on a first area of the surface 115, and liquid regions 124 with a second shape or size, different from the first shape or size, can be disposed in a second area of the surface 115.

In various embodiments, the liquid regions 124 can have varying cross-sectional shapes, which can be the same or different from the cross-sectional shapes of liquid regions in other areas on the surface 115. In some embodiments, the liquid regions 124 are substantially hemispherical, and appear as arrays of dots on the surface 115.

The liquid regions 124 can be uniformly arranged or randomly distributed in some areas on the surface 115, and randomly distributed on other areas if the surface 115.

In some embodiments, which are not intended to be limiting, the liquid regions 124 include a base having at least one microscale cross-sectional dimension. In various example embodiments, the liquid regions 124 can include a base on the surface 115 having cross-sectional dimensions of about 25 µm to about 1000 µm, or about 100 µm to about 300 µm, or about 150 µm to about 250 µm.

In some embodiments, which are provided as non-limiting examples, the height of the liquid regions 124 can vary from less than about 1 µm to about 10 µm as measured from a plane of the surface 115, or about 1 µm to about 100 µm, or about 1 µm to about 50 µm. In some embodiments, the height of the liquid transfer regions 124 is substantially the same, but some variation in height can be tolerated while maintaining good performance. For example, in some embodiments, the average height of the liquid regions 124 can vary by ±50 µm, while in other embodiments the average height can vary by ±10 µm, and in yet other embodiments the average height can vary by ±1 µm, while maintaining acceptable performance.

Figure 2B:
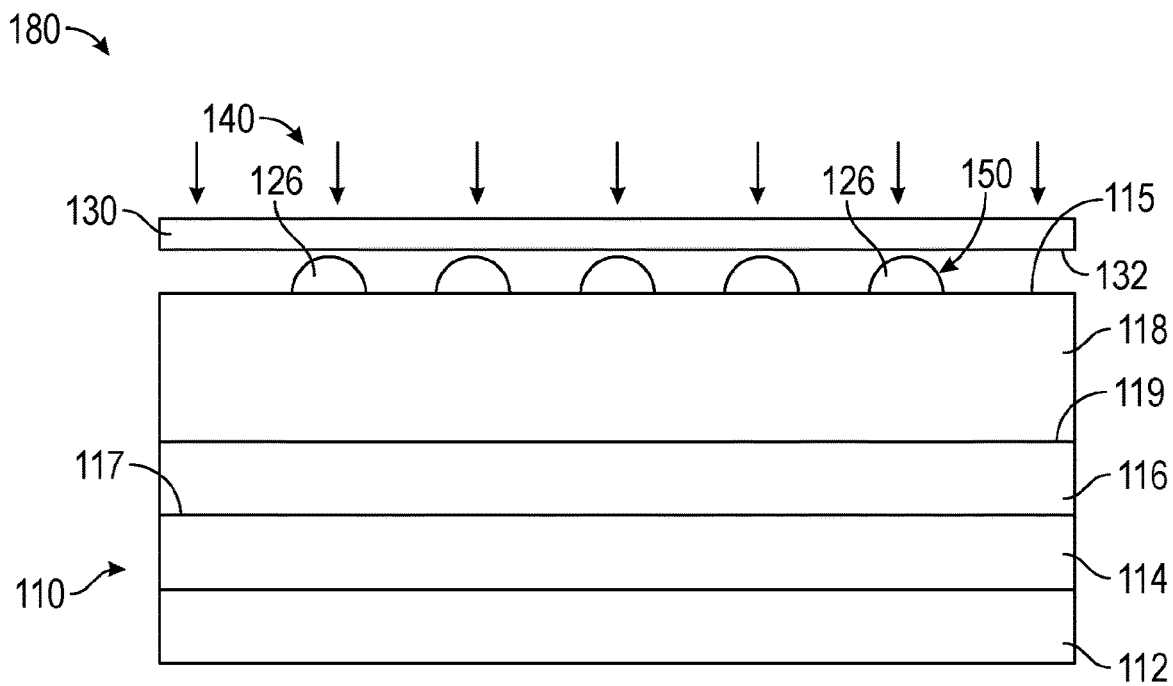

Referring now to FIG. 2B, the liquid regions 124 of FIG. 2A are at least partially hardened by a process such as, for example, air-drying, heating, curing with ultraviolet (UV) light, and combinations thereof, to form a first pixelated pattern 150 of at least partially hardened release structures 126. A polymeric film 130 is then applied on the release structures 126 such that a surface 132 thereof contacts, but does not adhere to, at least a portion of the release structures 126 to form a construction 180. In some embodiments the formation of the construction 180 may optionally include application of at least one of heat or pressure.

The polymeric film 130 may be selected from any suitable elastic polymeric material that is moldable to form a dental appliance, and once molded is generally conformable to a patient's teeth. The polymeric film 130 may be transparent, translucent, or opaque. In some embodiments, the polymeric film 130 is a clear or substantially transparent polymeric material that may include, for example, one or more of amorphous thermoplastic polymers, semi-crystalline thermoplastic polymers and transparent thermoplastic polymers chosen from polycarbonate, thermoplastic polyurethane, acrylic, polysulfone, polyprolylene, polypropylene/ethylene copolymer, cyclic olefin polymer/copolymer, poly-4-methyl-1-pentene or polyester/polycarbonate copolymer, styrenic polymeric materials, polyamide, polymethylpentene, polyetheretherketone and combinations thereof. In another embodiment, the polymeric film 130 may be chosen from clear or substantially transparent semi-crystalline thermoplastic, crystalline thermoplastics and composites, such as polyamide, polyethylene terephthalate. polybutylene terephthalate, polyester/polycarbonate copolymer, polyolefin, cyclic olefin polymer, styrenic copolymer, polyetherimide, polyetheretherketone, polyethersulfone, polytrimethylene terephthalate, and mixtures and combinations thereof. In some embodiments, the polymeric film 130 is a polymeric material chosen from polyethylene terephthalate, polyethylene terephthalate glycol, polycyclohexylenedimethylene terephthalate glycol, and mixtures and combinations thereof. One example of a commercially available material suitable as the elastic polymeric material for the polymeric film 130, which is not intended to be limiting, is polyethylene terephthalate (polyester with glycol additive (PETg)). Suitable PETg resins can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany.

The polymeric film 130 may be a single layer, or may include multiple layers of the same or different polymeric materials.

In various embodiments, the polymeric film 130 has a thickness of less than 1 mm, but varying thicknesses may be used depending on the application of the orthodontic appliance 100. In various embodiments, the polymeric film 130 has a thickness of about 50 µm to about 3,000 µm, or about 300 µm to about 2,000 µm, or about 500 µm to about 1,000 µm, or about 600 µm to about 700 µm.

In one embodiment, the polymeric film 130 is a substantially transparent polymeric material, which in this application refers to materials that pass light in the wavelength region sensitive to the human eye (about 0.4 micrometers (µm) to about 0.75 µm) while rejecting light in other regions of the electromagnetic spectrum. In some embodiments, the polymeric film 130 is substantially transparent to visible light of about 400 nm to about 750 nm at a thickness of about 50 µm to about 1000 µm. In various embodiments, the visible light transmission through the combined thickness of the polymeric film 130 is at least about 75%, or about 85%, or about 90%, or about 95%, or about 99%. In various embodiments, the substrate 16 has a haze of about 0% to about 20%, or about 1% to about 10%, or about 3% to about 8%. In various embodiments, the polymeric film 130 has a clarity of about 75% to about 100%, or about 85% to about 99%, or about 90% to about 95%. The optical properties of the polymeric film 130 can be measured using standards such as ASTM D1003 by a wide variety of optical instruments such as, for example, those available under the trade designation Haze Guard from BYK Gardner, Columbia, MD.

Following application of the polymeric film 130, the at least partially hardened release structures 126 may be fully hardened, if necessary, by a process 140 including, but not limited to, further heating, application of UV light, and the like.

Figure 2C:
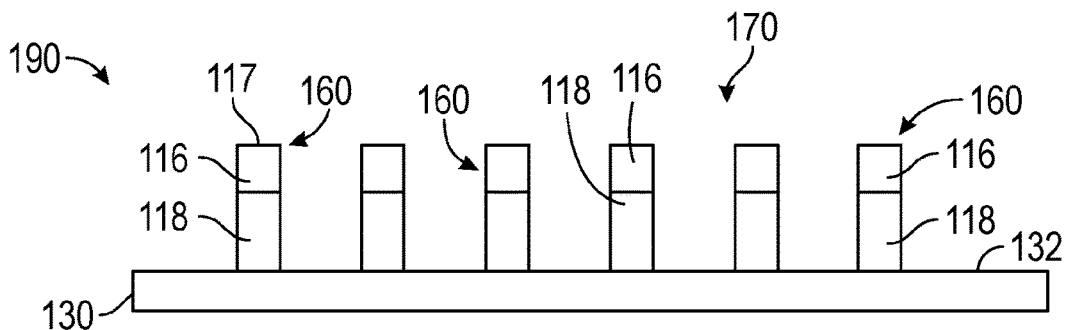

Referring now to FIG. 2C, the polymeric film substrate 130 is separated from the transfer article 110 to form a formable article 190. The first acrylate layer 116 is removed from the release layer 114 along the release surface 117, and the layers 114 and 112 (if present) are stripped away. The functional layer 118 adheres only in the areas unoccupied by the release structures 126, resulting in the formation of a second pixelated pattern 170 of discrete functional structures 160 on the surface 132 of the polymeric film 130, wherein the second pixelated pattern is an inverse of the first pattern 150.

In some embodiments, which are provided as an example, the functional structures 160 have a feature spacing (i.e., the center to center distance between adjacent structures) of about 100 µm to about 2000 µm or about 750 µm to about 1500 µm, or about 800 µm to about 1300 µm. In some embodiments, which are not intended to be limiting, the functional structures 160 are present on the surface 132 at about 10 to about 5000 dots per inch (dpi), or about 25 dpi to about 1000 dpi, or about 100 dpi to about 300 dpi.

In some example embodiments, the structures 160 have a characteristic length of about 25 µm to about 2500 µm, or about 100 µm to about 1500 µm, or about 750 µm to about 1400 µm. In some example embodiments, the structures 160 have an aspect ratio of about 0.0005 to about 0.01, or about 0.005 to about 0.05, or about 0.10 to about 0.20.

Figure 2D:
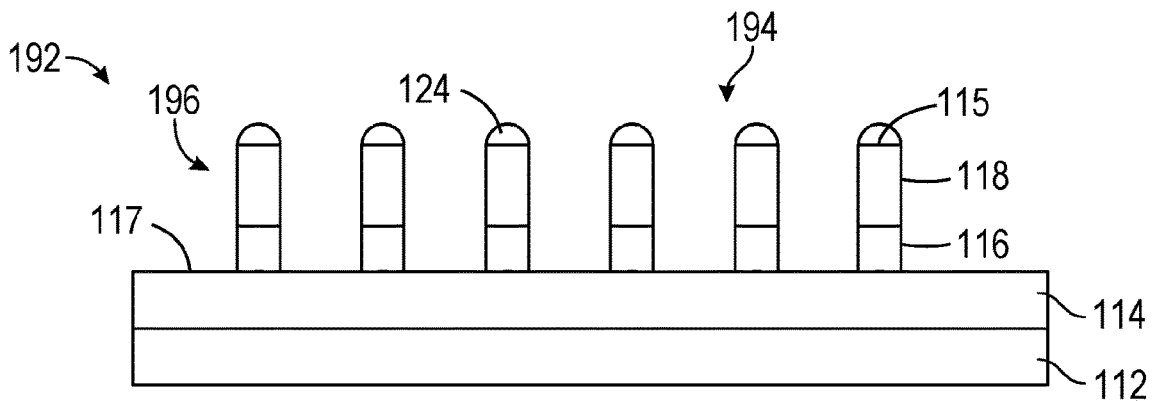

Referring now to FIG. 2D, after removal of the formable article 190 of FIG. 2C from the laminate construction 180 of FIG. 2B, the release article 192 includes a pattern 194 of structures 196 that corresponds to the first pattern 150 of the printed release structures. The structures 196 include an acrylate layer 116 on the surface 117 of the release layer 114, and a substrate 112. The functional layer 118 resides on the acrylate layer 116, and the release structures 124 reside on the functional layer 118.

The formable article 190 may then be formed into a dental appliance. For example, a plurality of cavities may be formed in the formable article 190 to form an orthodontic appliance, wherein the cavities are configured to receive one or more teeth. The cavities may be formed in the formable article 190 by any suitable technique, including thermoforming, laser processing, chemical or physical etching, and combinations thereof.

In some embodiments, the cavities are formed in the formable article 190 under processing conditions such that the pattern 170 and the individual functional structures 160 are not substantially distorted. For example, in some embodiments, the formable article 190 may be thermoformed at a temperature and pressure which distorts the functional structures 160 by less than about 50% in any dimension (for example, diameter, height, and the like). In some embodiments, the formable article 190 may be thermoformed at a temperature and a pressure such that an image formed by the pattern 170 of functional structures 160 is not substantially distorted, which in this application means that any image formed by the pattern 170 is still recognizable at a predetermined viewing distance.

Figure 3A:
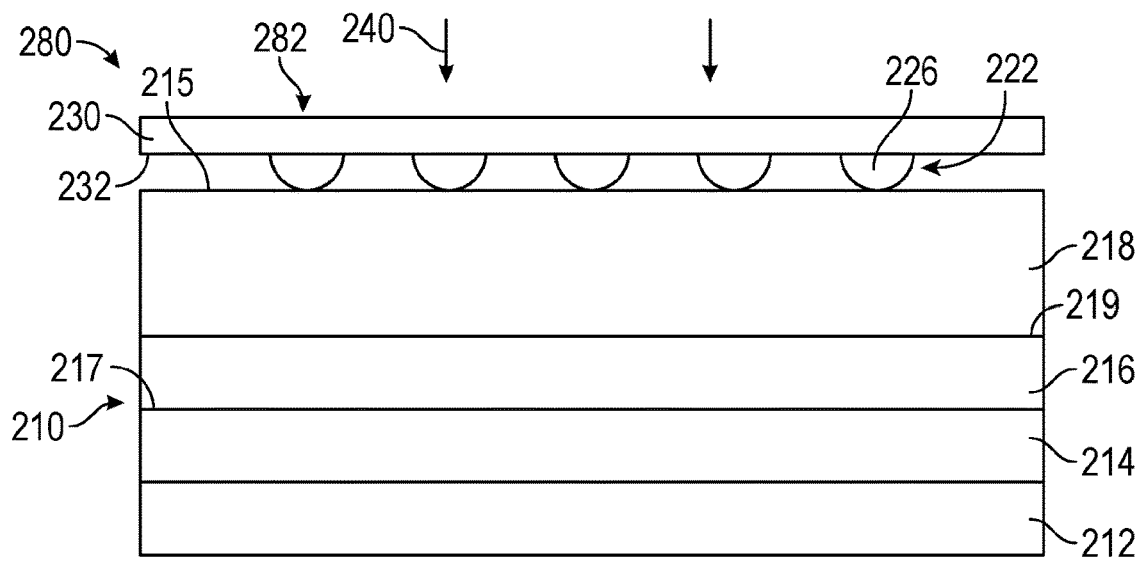
FIGS. 3A-3B are schematic cross-sectional views of the steps of a direct printing process for making structures on a substrate that can be formed into a dental appliance.

Referring now to FIG. 3A, a transfer article 210 includes an optional release layer substrate 212 overlain with a release layer 214. A first acrylate layer 216 contacts the release layer 214 along a release surface 217. A functional layer 218 includes a first major surface 219 contacting the first acrylate layer 216. In various embodiments, as discussed above with respect to FIG. 1, which will not be repeated here, the functional layer 218 can include a stack of one or more layers selected to provide a dental appliance with at least one of an aesthetic property such as, for example, an image, a logo, a bar code or a QR code pattern; a reflective or transmissive property; or at least one therapeutic benefit in a mouth of a patient such as, for example, antimicrobial, anti-biofilm, friction-reducing, anti-cavity agents, and mixtures and combinations thereof.

As discussed above with reference to FIG. 1, while not shown FIG. 3A, the functional layer 218 can include additional acrylate layers, which may be the same or different from the first acrylate layer 216, as well as optional adhesive layers.

A patterned transfer construction 282 includes a polymeric film 230 having a surface 232 including a pixelated pattern 222 of discrete transfer structures 226. As discussed above, the transfer structures 226 are applied as a liquid transfer composition on the surface 232 by a suitable printing process, and may optionally be hardened by at least one of air-drying, heating, UV curing, and the like. In various embodiments, which are not intended to be limiting, the transfer structures 226 are made from an adhesion modifying material such as an adhesive. In an alternative embodiment not shown in FIG. 3A, the transfer structures 226 may be applied directly on the surface 215 of the functional layer 218 of the transfer article 210, and the polymeric film 230 may subsequently be contacted with the transfer structures 226.

In some embodiments, the surface 232 of the polymeric film 230 may optionally be chemically or mechanically treated prior to applying the hardenable liquid composition to, for example, enhance adhesion between the surface 232 and the regions 226. In some embodiments, the surface 215 of the transfer article 210 may optionally be chemically or mechanically treated prior to applying the hardenable liquid composition to enhance adhesion between the surface 215 and the regions 226. Examples of suitable treatments include, but are not limited to, corona treatments, ozonation, application of silane coupling agents, application of primers, application of adhesives, and combinations thereof.

In various embodiments, as discussed above with respect to FIG. 2, which will not be repeated here, the transfer structures 226 may form a continuous or a discontinuous pattern, or both, of discrete transfer structures on the surface 232.

As shown schematically in FIG. 3A, the patterned transfer construction 282 is applied to an exposed surface 215 of the functional layer 218 of the transfer article 210. In some embodiments, the patterned transfer construction 282 and the transfer article 210 form a laminate construction 280, and in some embodiments the formation of the laminate construction 280 may optionally include application of at least one of heat or pressure. In some embodiments, the transfer structures 226 may optionally be hardened by a process 240 including heating, UV curing, and combinations thereof.

Figure 3B:
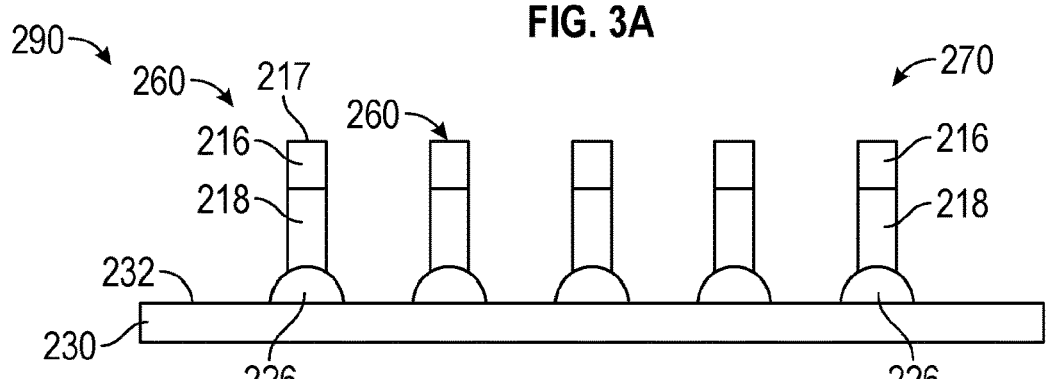

Referring now to FIG. 3B, the polymeric film 230 is separated from the laminate construction 280, which causes the first acrylate layer 216 to be removed from the release layer 214 along the release surface 217, and the layers 214 and 212 (if present) are stripped away. The functional layer 218 of the transfer article 210 adheres only to the adhesive transfer structures 226, resulting in the formation of a pixelated pattern 270 of functional structures 260 on the surface 232 of the polymeric film 230 that corresponds to the pattern 222 of the functional structures in FIG. 3A.

The polymeric film 230 including the discrete functional structures 260 forms a formable article 290 that may be formed into a dental appliance. A plurality of cavities may be formed in the formable article 290 to form an orthodontic appliance, wherein the cavities are configured to receive one or more teeth. The cavities may be formed in the formable article 290 by any suitable technique, including thermoforming, laser processing, chemical or physical etching, and combinations thereof.

In some embodiments, the cavities are formed in the formable article 290 under processing conditions such that the pattern 270 and the functional structures 260 are not substantially distorted. For example, in some embodiments, the formable article 290 may be thermoformed at a temperature and pressure which distorts the functional structures 260 by less than about 50% in any dimension (for example, diameter, height, and the like). In some embodiments, the formable article 290 may be thermoformed at a temperature and a pressure such that an image formed by the pattern 270 of functional structures 260 is not substantially distorted.

Figure 4A:
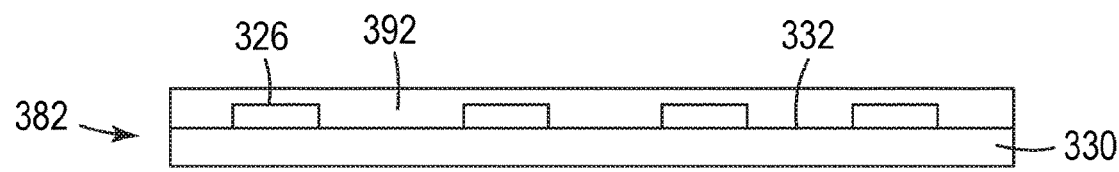
FIGS. 4A-4C are schematic cross-sectional views of the steps of a polyvinyl alcohol (PVA) transfer process for making structures on a substrate that can be formed into a dental appliance.

Referring now to FIG. 4A, a patterned transfer construction 382 includes a polymeric film 330 having a surface 332 including a pixelated pattern 322 of transfer structures 326 applied thereon. As discussed above, the transfer structures 326 are applied as a liquid on the surface 332 by any suitable printing process, and may optionally be at least partially hardened by at least one of air-drying, heating, UV curing, and the like. In various embodiments, as discussed in detail above, the transfer structures 326 are made of an adhesion modifying material such as, for example, polyvinyl alcohol (PVA).

A layer 392 of a functional material is applied over the transfer structures 326. The functional layer 392 may include any of the functional materials discussed above, and in some example embodiments can include at least one bioactive metal or metal oxide $MO_x$ such as, for example, silver, silver oxide, copper oxide, gold oxide, zinc oxide, magnesium oxide, titanium oxide, chromium oxide, and mixtures, alloys and combinations thereof. In some example embodiments, the bioactive metal or metal oxide can be applied over the transfer structures 326 by a method such as sputtering, physical vapor deposition (PVD), and the like.

The functional layer 392 can include any antimicrobially effective amount of the metal or the metal oxide $MO_x$. In various embodiments, which are not intended to be limiting, the functional layer 392 can include less than 100 mg, less than 40 mg, less than 20 mg, or less than 5 mg $MO_x$ per 100 $cm^2$. The metal oxide can include, but is not limited to, silver oxide, copper oxide, gold oxide, zinc oxide, magnesium oxide, titanium oxide, chromium oxide, and mixtures, alloys and combinations thereof. In some embodiments, which are not intended to be limiting, the metal oxide can be chosen from AgCuZnOx, Ag doped ZnOx, Ag doped AZO, Ag doped $TiO_2$, Al doped ZnO, and TiOx.

Figure 4B:
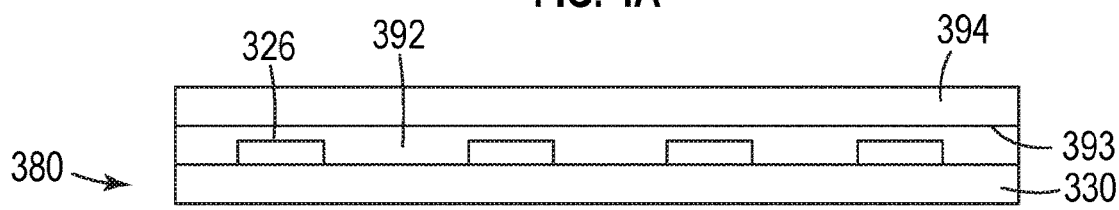

Referring now to FIG. 4B, a polymeric film substrate 394 is contacted with the functional layer 392 such that the functional layer 392 contacts a surface 393 thereof and forms a laminate construction 380. In some embodiments the formation of the laminate construction 380 may optionally include application of at least one of heat or pressure.

Figure 4C:
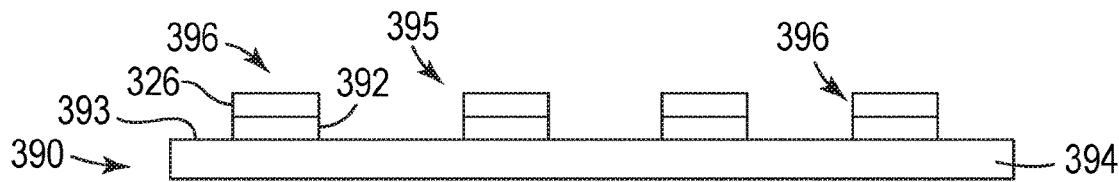

As shown in FIG. 4C, the polymeric film layer 330 is subsequently separated from the laminate construction 380 shown in FIG. 4B, and the transfer structures 326 are transferred from the surface 332 of the polymeric film layer 330, along with underlying portions of the functional layer 392, to the polymeric film layer 394. The transfer provides on the surface 393 of the polymeric film layer 394 a pixelated pattern 395 of functional structures 396 corresponding to the pattern 322 of FIG. 4A, and forms a formable article 390 that may be formed into a dental appliance.

In an alternative embodiment not shown in FIGS. 4A-4C, if the structures 326 are made of a release material such as, for example, a silicone, when the polymeric film layer 330 is separated from the laminate construction 380, the functional layer 392 instead releases from the structures 326 and attaches to the surface 393 of the polymeric film layer 394.

A plurality of cavities may then be formed in the formable article 390 to form an orthodontic appliance, wherein the cavities are configured to receive one or more teeth. The cavities may be formed in the formable article 390 by any suitable technique, including thermoforming, laser processing, chemical or physical etching, and combinations thereof.

In some embodiments, the cavities are formed in the formable article 390 under processing conditions such that the pattern 395 and the functional structures 396 are not substantially distorted. For example, in some embodiments, the formable article 390 may be thermoformed at a temperature and pressure which distorts the functional structures 396 by less than about 50% in any dimension (for example, diameter, height, and the like). In some embodiments, the formable article 390 may be thermoformed at a temperature and a pressure such that an image formed by the pattern 395 of functional structures 396 is not substantially distorted.

Figure 5:
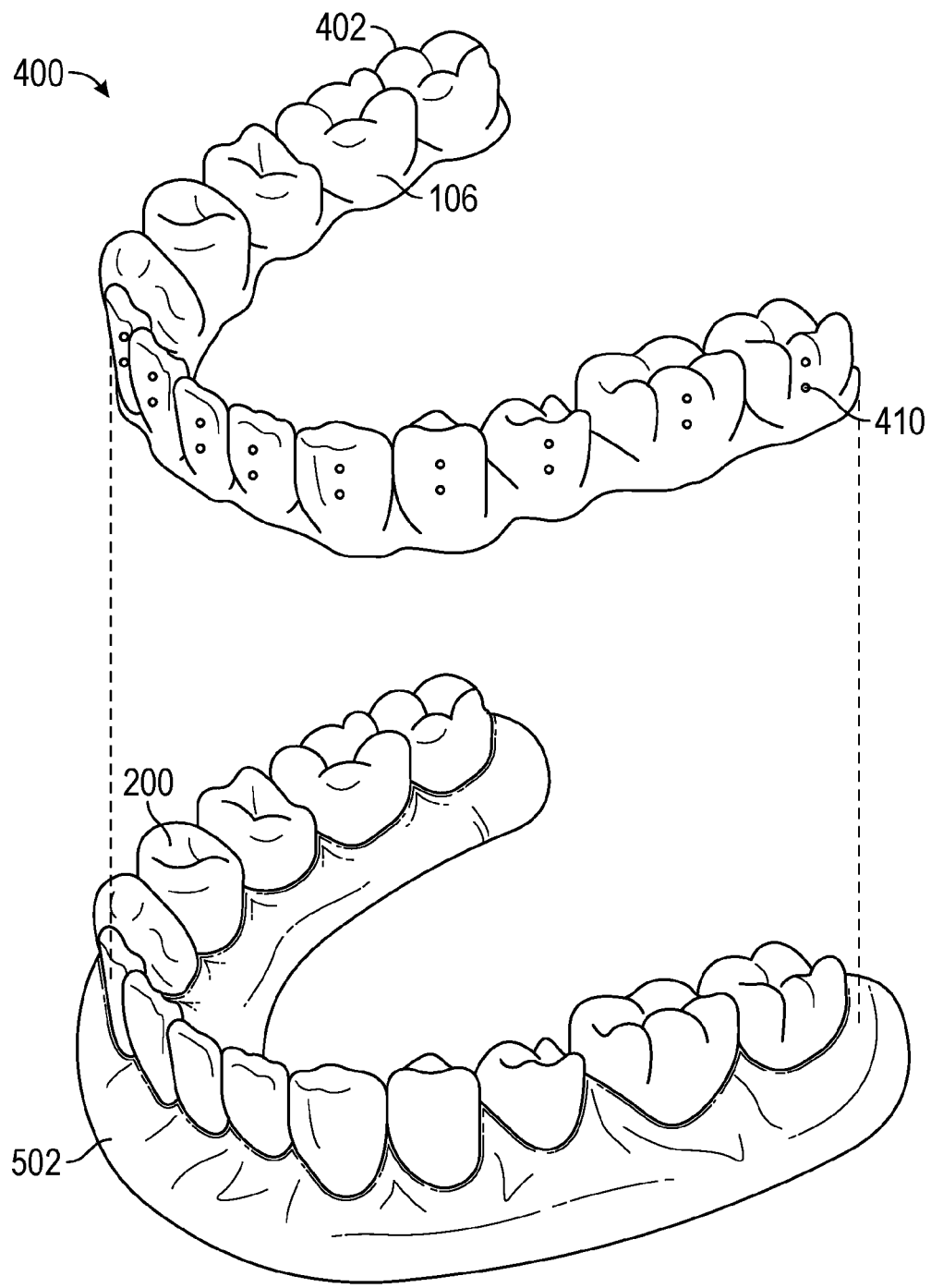
FIG. 5 is a schematic perspective view of a dental appliance (clear tray aligner (CTA)) as applied to teeth of a patient.

Referring now to FIG. 5, a shell 402 of an orthodontic appliance 400 is an elastic polymeric material that generally conforms to a patient's teeth 500, but that is slightly out of alignment with the patient's initial tooth configuration. In some embodiments, the shell 402 may be one of a group or a series of shells having substantially the same shape or mold, but which are formed from different materials to provide a different stiffness or resilience as need to move the teeth of the patient. In this manner, in one embodiment, a patient or a user may alternately use one of the orthodontic appliances during each treatment stage depending upon the patient's desired usage time or treatment time period for each treatment stage.

No wires or other means may be provided for holding the shell 402 over the teeth 500, but in some embodiments, it may be desirable or necessary to provide individual anchors on teeth with corresponding receptacles or apertures in the shell 402 so that the shell 402 can apply a retentive or other directional orthodontic force on the tooth which would not be possible in the absence of such an anchor.

The shells 402 may be customized, for example, for day time use and night time use, during function or non-function (chewing vs. non-chewing), during social settings (where appearance may be more important) and nonsocial settings (where the aesthetic appearance may not be a significant factor), or based on the patient's desire to accelerate the teeth movement (by optionally using the more stiff appliance for a longer period of time as opposed to the less stiff appliance for each treatment stage).

For example, in one aspect, the patient may be provided with a clear orthodontic appliance 400 that may be primarily used to retain the position of the teeth, and an opaque orthodontic appliance that may be primarily used to move the teeth for each treatment stage. Accordingly, during the daytime, in social settings, or otherwise in an environment where the patient is more acutely aware of the physical appearance, the patient may use the clear appliance. Moreover, during the evening or nighttime, in non-social settings, or otherwise when in an environment where physical appearance is less important, the patient may use the opaque appliance that is configured to apply a different amount of force or otherwise has a stiffer configuration to accelerate the teeth movement during each treatment stage. This approach may be repeated so that each of the pair of appliances are alternately used during each treatment stage.

Referring again to FIG. 5, systems and method in accordance with the various embodiments include a plurality of incremental position adjustment appliances, each formed from the same or a different material, for each treatment stage of orthodontic treatment. The orthodontic appliances may be configured to incrementally reposition individual teeth 500 in an upper or lower jaw 502 of a patient. In some embodiments, cavities 504 are configured such that selected teeth will be repositioned, while others of the teeth will be designated as a base or anchor region for holding the repositioning appliance in place as it applies the resilient repositioning force against the tooth or teeth intended to be repositioned.

Placement of the elastic positioner shell 402 over the teeth 500 applies controlled forces in specific locations to gradually move the teeth into the new configuration. Repetition of this process with successive appliances having different configurations eventually moves a patient's teeth through a series of intermediate configurations to a final desired configuration. During the movement process, structures 410 on the shell 402 provide a therapeutic or aesthetic function as described above.

In one example embodiment, the orthodontic alignment appliances may include a shell 402 made from a clear elastomeric polymeric material and are referred to as a clear tray aligner (CTA). In use, CTAs at stage one (N) of treatment are inserted over a dental arch with misaligned or malocclusion dentition at stage zero (N−1). The polymeric tray can be stretched to force the dentition to reposition into the next stage one (N). In other words, each aligner tray starts out "ill-fitting" on purpose. The polymeric tray may have a contoured surface to be able to engage and transfer forces to the dentition to effectively reposition the right tooth or set of teeth at a designated location, vector and time. Because of the ability of the polymeric tray to engage and/or transfer forces to the dentition while starting out "ill-fitting," the CTA can be effective and/or efficient appliance for, e.g., correcting Class II malocclusions, more comfortable to patient, easy to place/remove, and providing predictable treatment outcome. Therefore, a polymeric aligner tray with some flexibility at least in part because of its flat surface may be able to engage and/or transfer forces to the dentition to effectively reposition the right tooth or set of teeth at a designated location, vector and time. Because of the fit between the tooth or set of teeth, the CTA can be effective and/or efficient appliance for correcting Class II malocclusions and be comfortable to the patient, easy to place/remove, predictable treatment outcome, etc.

Embodiments will now be illustrated with reference to the following non-limiting examples.

EXAMPLES

Silver (Ag) Transfer Foil Film (FIG. 6A)

A transferrable thin film shown schematically in FIG. 6A was made on a vacuum coater similar to those described in U.S. Pat. No. 8,658,248 (Anderson et al.) and U.S. Pat. No. 7,018,713 (Padiyath, et al.). The coater was threaded up with a substrate in the form of an indefinite length roll of 0.0250 mm thick, 35.6 cm wide aluminized biaxially-oriented polypropylene (BOPP) film available under the trade designation TorayFAN PMX2 from Toray Plastics (America), Inc., North Kingstown, RI, and this substrate was advanced at a constant line speed of 9.8 m/min.

A first organic layer was formed on the aluminum layer of the BOPP substrate by applying an acrylate liquid based on tricyclodecane dimethanol diacrylate, available under the trade designation SARTOMER SR833S from Sartomer USA, Exton, PA by ultrasonic atomization and flash evaporation to make a coating width of 31.8 cm. This monomeric coating was subsequently cured immediately downstream with an electron beam curing gun operating at 7.0 kV and 10.0 mA. The flow of liquid monomer into the evaporator was 0.67 ml/min, the nitrogen gas flow rate was 100 sccm, the evaporator temperature was set at 500° F. (260° C.), and the process drum temperature was 14° F. (−10° C.). The aluminum surface of the TorayFAN PMX2 film and the first organic layer decoupled with a 180° Peel force of 0.283 grams per mm.

On top of this first organic layer, a silver reflector layer was deposited by DC sputtering of a >99% silver cathode target. The system was operated at 3 kW with a 9.1 meters per minute line speed. Two subsequent depositions with the same power and line-speed were performed to create a 90 nm layer of silver.

On top of this silver layer, an oxide layer of silicon aluminum oxide was deposited by AC reactive sputtering. The cathode had a Si(90%)/Al(10%) target obtained from Soleras Advanced Coatings US, of Biddeford, ME. The voltage for the cathode during sputtering was controlled by a feed-back control loop that monitored the voltage and controlled the oxygen flow such that the voltage would remain high and not crash the target voltage. The system was operated at 16 kW of power to deposit a 6 nm thick layer of silicon aluminum oxide onto the silver reflector.

Silver Oxide Transfer Foil Film (FIG. 6B)

The transferrable thin films shown schematically in FIG. 6B were made on the vacuum coater used to make the Ag transfer foil film of FIG. 6A described above. The coater was threaded up with a substrate in the form of an indefinite length roll of 0.0500 mm thick, 35.6 cm wide, PET film from DowDuPont, which included a layer of NiFe to provide an interface break with the SR833 acrylate layer, and this film substrate was advanced at a constant line speed of 9.8 m/min.

The film was treated with plasma to enhance the adhesion of the first metal layer. The plasma was generated from a DC source at 0.3 kW at a pressure of 1 mT and a speed of 2.4 m/min. The first metal layer was deposited from an 80/20 Ni/Fe target obtained from ACI Alloys, San Jose, CA using a DC source at 4 kW, a pressure of 1 milliTorr and a web speed of 2.4 meters per minute.

A first organic layer was formed on the substrate by applying the SARTOMER SR833S acrylate liquid by ultrasonic atomization and flash evaporation to make a coating width of 31.8 cm. This monomeric coating was subsequently cured immediately downstream with an electron beam curing gun operating at 7.0 kV and 10.0 mA. The flow of liquid monomer into the evaporator was 0.67 ml/min, the nitrogen gas flow rate was 100 sccm, the evaporator temperature was set at 500° F. (260° C.), and the process drum temperature was 14° F. (−10° C.).

On top of this first organic layer, a silver oxide layer was deposited by DC reactive sputtering of a >99% silver cathode target. The system was operated at 1 kW at a pressure of 7.8 mT with 20 sccm $O_2$ gas and the balance Ar with a 1.22 meters per minute line speed to generate a 25 nm thick AgO coating. In some cases, second, third, and fourth passes were used to create AgO coatings of 50 nm, 100 nm and 150 nm.

On top of this silver oxide layer, an oxide layer of silicon oxide was deposited by DC reactive sputtering. The cathode had a Si target obtained from Soleras Advanced Coatings US, of Biddeford, (Me.). The voltage for the cathode during sputtering was controlled by a feed-back control loop that monitored the voltage and controlled the oxygen flow such that the voltage would remain high and not crash the target voltage. The system was operated at 2.8 kW of power to deposit a 12 nm thick layer of silicon oxide.

The NiFe surface of the film and the first organic layer were designed to decouple with a 180° Peel force of 0.283 g per mm.

A $CaF_2$ layer was deposited on the silicon aluminum oxide layer via evaporation with no applied heating to the substrate at a base vacuum ($10^{-6}$ torr range) to a 90 nm thickness.

Transfer Inks

Three different transfer inks were used in the examples below: 1) UV Easy Release Coating (UVF03408-465, Flint Group, Plymouth, MI); 2) Scotchbond Universal Adhesive (3M, St. Paul, MN); and, 3) 80% hydrolyzed 9,000-10,000 Mw polyvinyl alcohol (PVA) (Sigma-Aldrich, St. Louis, MO).

Test Methods

Tarnish Resistance

Tarnish testing media was an acidic solution, pH 3.7, containing 6.25 g ketchup, 6.25 g mustard and 87.5 g water. One each was separately aged in the acidic solution for 1, 5, 10 and 60 min. After each soak period, the test strips were removed from the tarnish test media, thoroughly rinsed with deionized (DI) water and visually examined for color difference, if any, between the samples was recorded.

Antimicrobial Kill Assay

Modified ISO 22196:2011 method 'Measurement of Antibacterial Activity on Plastic and Other Non-Porous Surfaces' was used for evaluating the antibacterial properties of articles of the Examples. Test samples were cut into square coupons (1 inch by 1 inch, n=3). An inoculum of *Streptococcus mutans* (ATCC 27352) was prepared in phosphate buffer and artificial saliva. The composition of the artificial saliva was as following (g/L): gastric mucin, Sigma Porcine stomach mucin type III, 2.2; NaCl, 0.381, $CaCl_2.2H_2O$, 0.213, $KH_2PO_4$, 0.738, and KCl, 1.114. Bacteria inoculum (159 ul) with target concentration of 1× 106 CFU/ml was spread over the coated/treated side of PETG substrate and incubated for 0, 2 and 24 hours at 37° C. After incubation, samples were neutralized in DE neutralizing broth ((Dey/Engley) Neutralizing broth (from Difco)) and accessed for viable cell count using plate count culture method.

Plate Count Culture Method

Viable bacteria were enumerated by performing 10-fold serial dilutions of the DE neutralizing broth (1 ml) in Butterfield phosphate buffer (3M). One hundred microliters of each dilution was spread-plated on TSA plates (Tryptic Soy Agar, Hardy Diagnostics). TSA plates were incubated for 48 hours under anaerobic conditions at 37° C. After incubation colonies were manually counted.

F-Ion Release

Fluoride ion release measurements were obtained according to 3M Oral Care DTS-1218 Determination of Fluoride Release. A total of five disks (2-cm diameter) were made per coating and each disk was stored in a plastic centrifuge tube (50 mL) with 25 mL of MilliQ water at 37 C. Age the centrifuge tubes with its contents upright in an oven at 37 C. The experiment was carried out over a period of one week with data collection points after 1 day, 3 days, and 7 days. At each time point, 5 mL aliquot from each centrifuge tube was mixed with 5 mL TISAB II to measure F-ion (parts per million) content using a calibrated ion-selective electrode.

The data were averaged and plotted as release by time point, as well as cumulative fluoride released over the duration of the experiment.

Example 1

To exemplify the first approach of "indirect foil transfer" of a silver foil pattern shown schematically in FIGS. 2A-2C above, grid patterns of an adhesion modifying material were flexographically printed onto a transfer foil film, described in FIG. 6A, on a 3M pilot printing line, and later transferred to 0.75 mm thick clear PETG.

The silver transfer foil film was as described above in the materials section and shown schematically in FIG. 6A. A 0.067" Digital MAX photopolymer flexographic printing plate (MacDermid Graphics Solutions, Atlanta, GA) imaged with a regular pattern of the inverse of squares (100, 200, and 300 μm squares on 1000 μm pitch) was mounted with 3M E1060H Cushion-Mount (3M, St. Paul, MN) flexographic printing tape, and printed with the UV easy release ink.

The release ink pattern on the foil substrate was then transported through a Xeric Web UV curing station (XDS Holding Inc, Neenah, WI) to sufficiently harden the printed ink (i.e., such that it felt hard to the touch and could not be rubbed from the PETG surface).

Then the inverse of the printed image on the foil substrate was transferred on to PETG discs (125 mm dia.×0.75 mm thick) in a Carver press at 5000 psi for 1-minute at 250° F. Subsequently, the rest of the foil film was peeled away from PETG to transfer the inverse of the image onto the PETG.

Figure 7A:
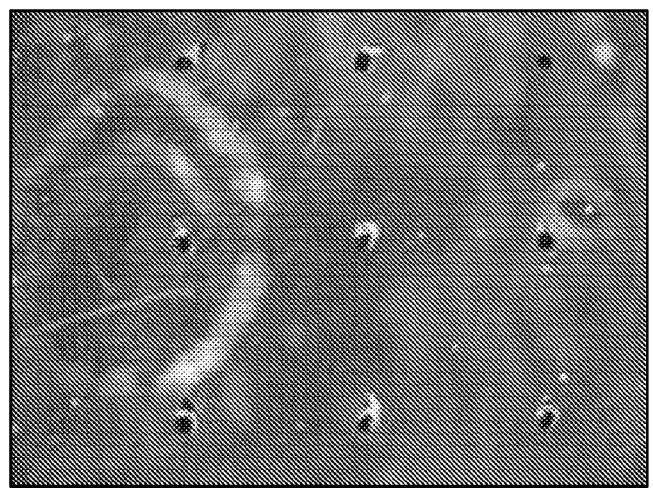
FIGS. 7A-7C are photographs of printed patterns with a 1000 micron pitch on PETG substrates produced by the indirect printing process of Example 1 and FIGS. 2A-2C.
Figure 7B:
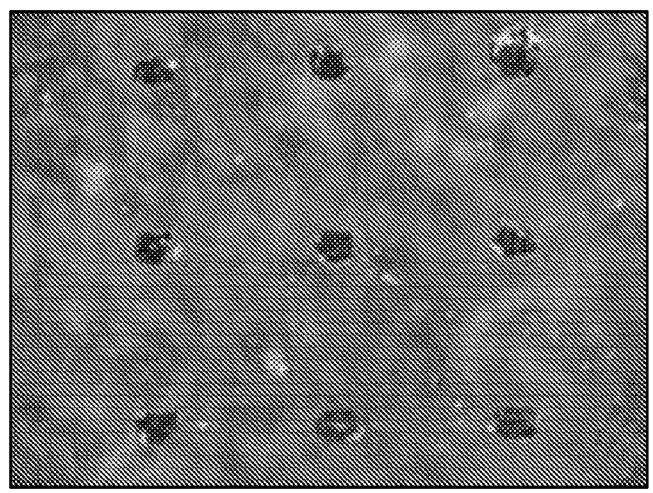
Figure 7C:
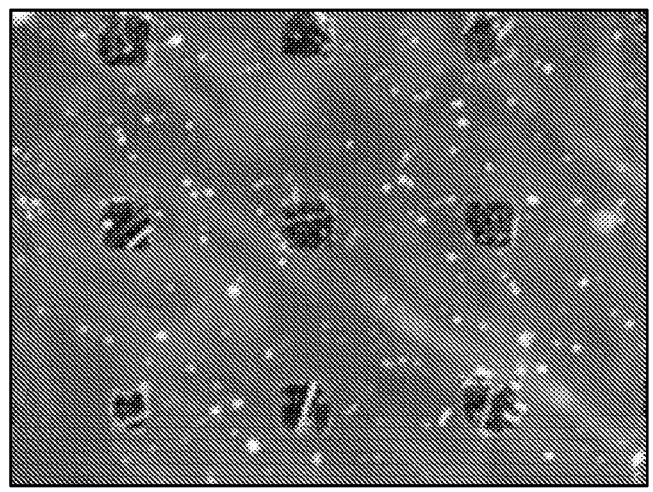

The pixelated PETG discs included foil squares with different feature dimensions at a 1000 micron pitch. The discs shown in the optical micrograph image of FIG. 7A included features with a diameter of 100 microns, the discs shown in FIG. 7B had features with a diameter of 200 microns, and the discs shown in FIG. 7C had a diameter of 300 microns.

The discs were then thermoformed with a Biostar VI pressure molding/thermoforming machine (Scheu Dental, Great Lakes, Tonawanda, NY) to produce a clear tray aligner (CTA) per UTK-RDTP-11-300071.

Figure 8A:
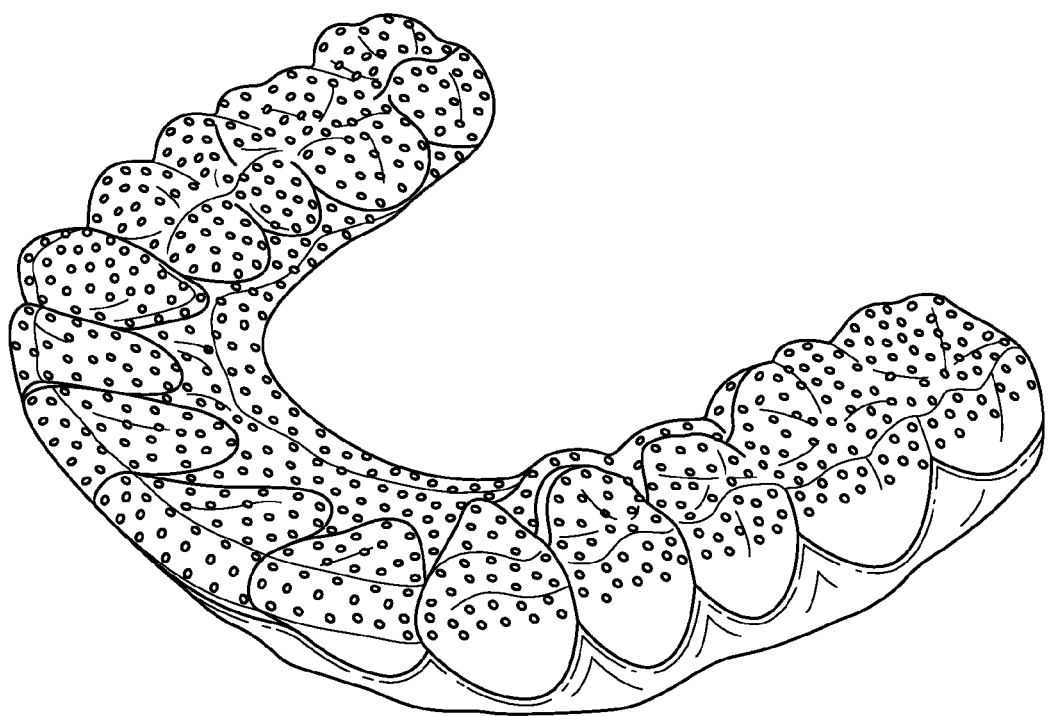
FIG. 8A is a depiction of a thermoformed clear tray aligner (CTA) with a pixelated Ag pattern produced with the indirect printing process of Example 1.
Figure 8B:
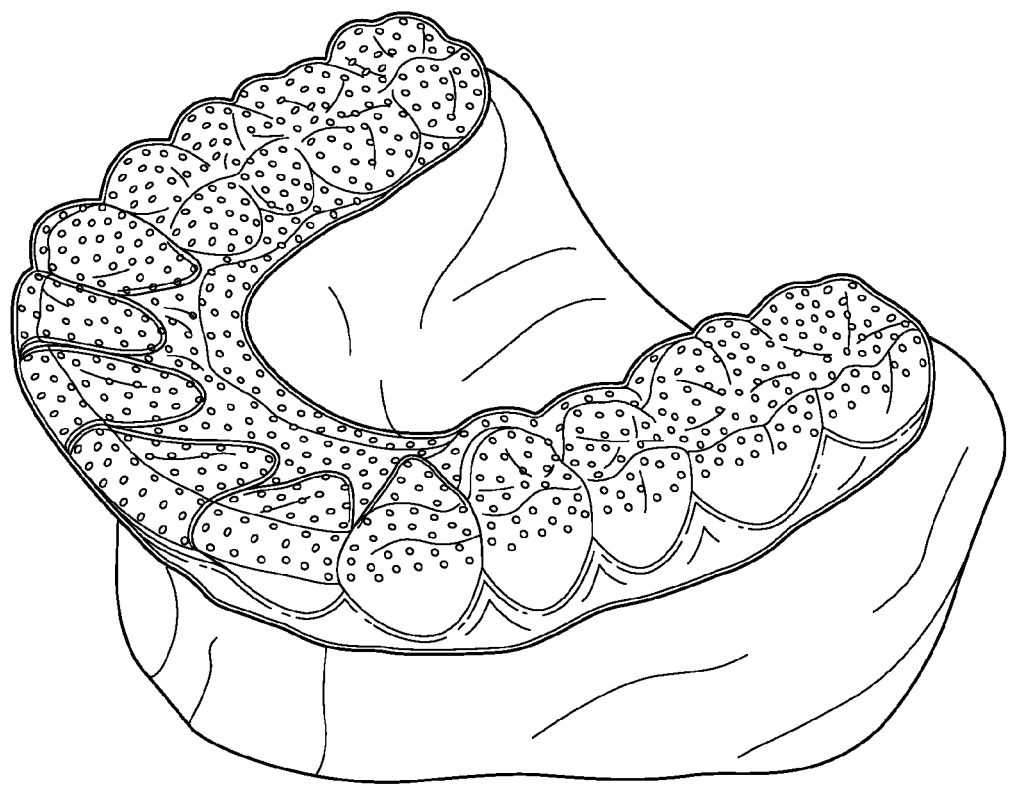
FIG. 8B is a depiction of the CTA with the pixelated Ag pattern on a typodont.

FIG. 8A is a depiction of the Ag foil patterned CTA, and FIG. 8B is a depiction of the CTA on a typodont.

A pixelated Ag (300 μm×1000 μm) on PETG disc was found to be resistant to discoloration when exposed to a ketchup-mustard mixture up to 1 hr.

Table-I shows that log bacteria count reduction in 24 hour by full coverage Ag and pixelated Ag (300 μm×1000 μm) were 6.3 and 4.1, respectively. These data suggest that the antimicrobial activity of Ag can be controlled via size and density of pixels.

TABLE I

| | Log CFU/gm (n = 3) | | |
|---|---|---|---|
| Test Materials | 0 hr | 2 hr | 24 hr |
| Buffer | 7.97 | 7.99 | 7.97 |
| PETG-Control | | 8.01 | 8.01 |
| PETG with Full Coverage Silver | | 7.61 | 1.7 |
| PETG with 300 um Squares | | 8.01 | 3.87 |

Example 2

To exemplify the second approach of "direct foil patterning" of a discrete Ag pattern illustrated schematically in FIGS. 3A-3B above, an adhesive with a hex packed pattern was flexographically printed on one side of PETG film (0.75 mm thickness) using a Flexiproofer 100 (RK Print Coat Instruments, Litlington, Royston, Herts SG8 0QZ).

A flexographic printing plate available from DowDuPont under the trade designation CYREL DPR 0.067 imaged with a hex packed dot array pattern (~1500 µm dots on a 3000 µm pitch) (Southern Graphics Systems Inc., Brooklyn Park, MN) was mounted with 3M E1060H Cushion-Mount (3M, St. Paul, MN) flexographic printing tape, and printed with an adhesive available from 3M under the trade designation SCOTCHBOND universal adhesive. The resulting adhesive film was then allowed to dry at room temperature.

The printed PETG film was then laminated to a metal transfer film as described above using a Hot Roll Laminator (ChemInstuments, Fairfield, Ohio). Then keeping these two films together, the laminated construction was transported through a Fusion UV conveyor belt equipped with a H-Bulb UV curing lamp (Haraeus Group, Hanau, Germany) to sufficiently cure and solidify the printed ink (i.e., such that it felt hard to the touch and could not be rubbed from the PETG surface). The metal transfer foil film was then removed leaving foil only where the adhesive was printed.

Figure 9:
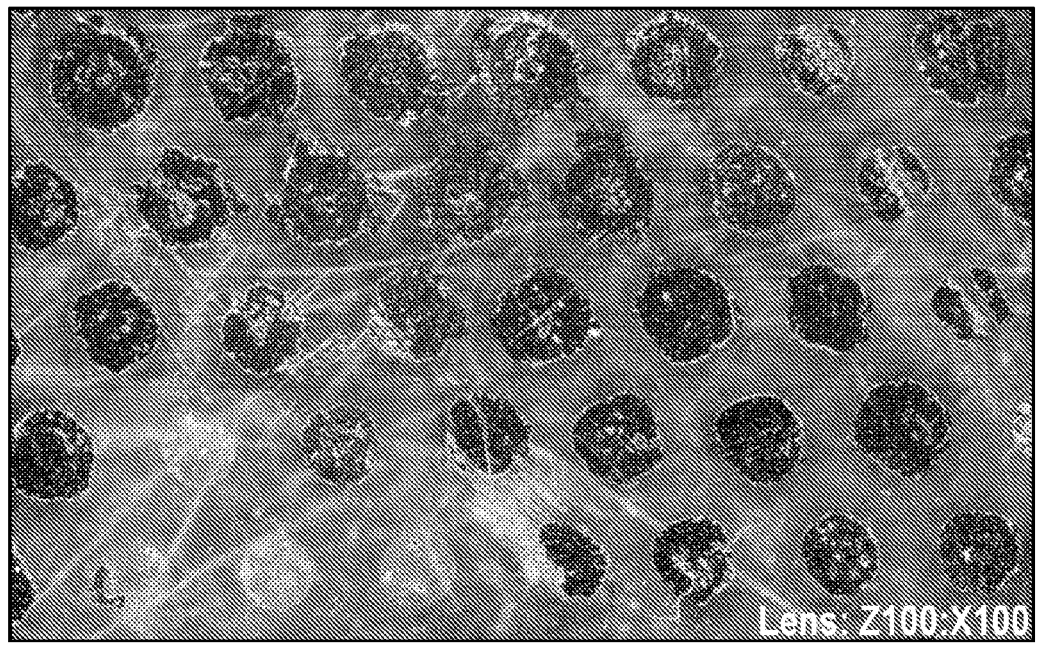
FIG. 9 is a photograph of pixelated Ag structures on a PETG film produced with the direct printing process shown schematically in FIGS. 3A-3B and described in Example 2 below.

The printed PETG was then thermoformed with a Biostar VI pressure molding/thermoforming machine (Scheu Dental, Great Lakes, Tonawanda, NY) to shape a thermoplastic disc with 125 mm diameter into an orthodontic aligner tray per UTK-RDTP-11-300071. FIG. 9 shows a micrograph of the antimicrobial transfer foil patterns on PETG.

Example 3

To exemplify the third approach illustrated schematically in FIGS. 4A-4B above, a polyvinyl alcohol (PVA) transfer ink was printed with repeating square pattern onto an unprimed side of Mylar DS PET film (DowDupont Teijin Films-America's Region, Chester, VA) on a 3M pilot printing line and later metalized and transferred to 0.75 mm thick clear PETG.

A 0.067" (1.7 mm) Digital MAX photopolymer flexographic printing plate (MacDermid Graphics Solutions, Atlanta, GA) mounted with 3M E1060H Cushion-Mount (3M, St. Paul, MN) flexographic printing tape were used to print the PVA.

The PVA on the unprimed PET was then transported through two XDS Hot Air Dryer (Xeric Web Drying Systems, Neenah, Wi) at 180° F. (82° C.) to sufficiently dry the water from the PVA (i.e., such that it felt hard to the touch and could not be easily rubbed from the PET surface).

The printed image on the PET film had a reflector layer deposited by DC sputtering of a 99% silver cathode target. The system was operated at differing power and line speed settings to get desired silver layer thicknesses.

The printed image on the PET substrate with silver coated on top of it was transferred on to PETG discs (125 mm dia.×0.75 mm thick) in a Carver press at 5000 psi for 1-min and 225° F. (107° C.). Subsequently, the PET was peeled away from PETG to transfer the image onto the PETG.

The PETG discs with PVA transfer printed silver were then thermoformed with a Biostar VI pressure molding/thermoforming machine (Scheu Dental, Great Lakes, Tonawanda, NY) to produce a CTA per UTK-RDTP-11-300071.

Figure 10:
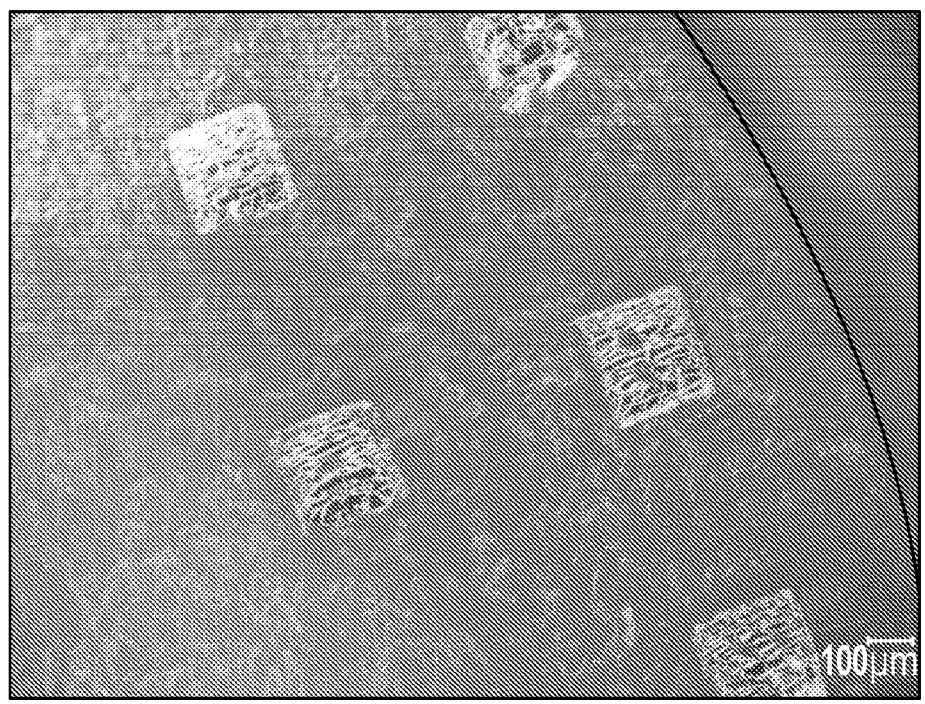
FIG. 10 is a photograph of Ag squares printed on PETG film using the polyvinyl alcohol (PVA) transfer process shown schematically in FIGS. 4A-4B and described in Example 3 below.

FIG. 10 shows a micrograph of the silver and PVA transferred to a PETG disk.

Example 4

Figure 11A:
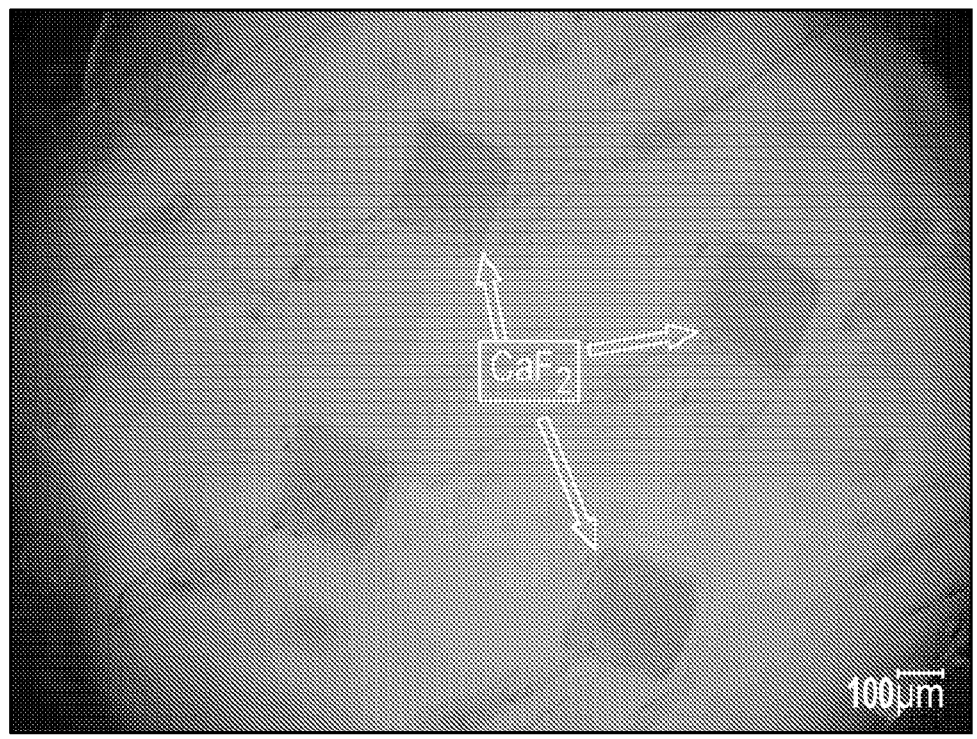
FIG. 11A is a photograph of patterns of $CaF_2$ on PETG made with the indirect transfer process shown schematically in FIGS. 2A-2C and described in Example 4 below.
Figure 11B:
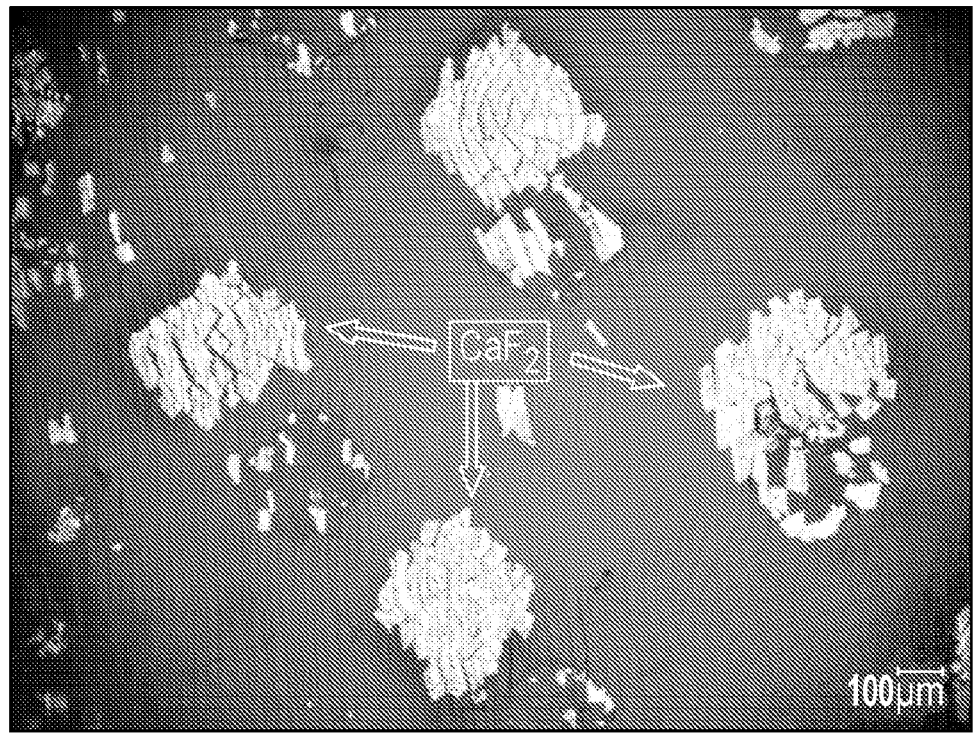
FIG. 11B is a photograph of patterns of Ag—$CaF_2$ on PETG made with the indirect transfer process shown schematically in FIGS. 2A-2C and described in Example 4 below. The patterns in both FIGS. 11A-11B included 400 micron squares on a 1200 micron pitch.

As described in Example 1 above, a $CaF_2$ layer (90 nm thick) and an Ag—$CaF_2$ layer (each 90 nm thick) were transferred on to 0.75 mm thick PETG disk (400 micron squares on a 1200 micron pitch). Photographs of the discs are shown in FIGS. 11A-11B.

Fluoride ion release from a 100% coverage $CaF_2$ foil film and Ag—$CaF_2$ foil stack film, each with 90 nm thick $CaF_2$, released 3.52 uF/cm$^2$ and 3.5 uF/cm$^2$, respectively. Therefore, F-ion release from pixelated transfer films of $CaF_2$ and Ag—$CaF_2$ on PETG with 11% surface coverage would be expected to be proportionately less at about 0.38 uF/cm$^2$.

In clinical situations, CTAs with $CaF_2$ would provide protection against caries from Ca and F ion release and with Ag—$CaF_2$ would provide both beneficial antimicrobial and Ca/F ion release properties.

Example 5

To exemplify the approach of "indirect foil transfer" of an antimicrobial foil pattern, grid patterns were flexographically printed onto a transfer foil film on a pilot printing line at different coverages and thicknesses and were later transferred to 0.75 mm thick clear PETG. The transfer foil film was a transferrable thin film as described above having layers of NiFe, Acrylate, AgO, and $SiO_2$ (FIG. 6A) where the NiFe and first organic layer were designed to decouple.

Figure 12A:
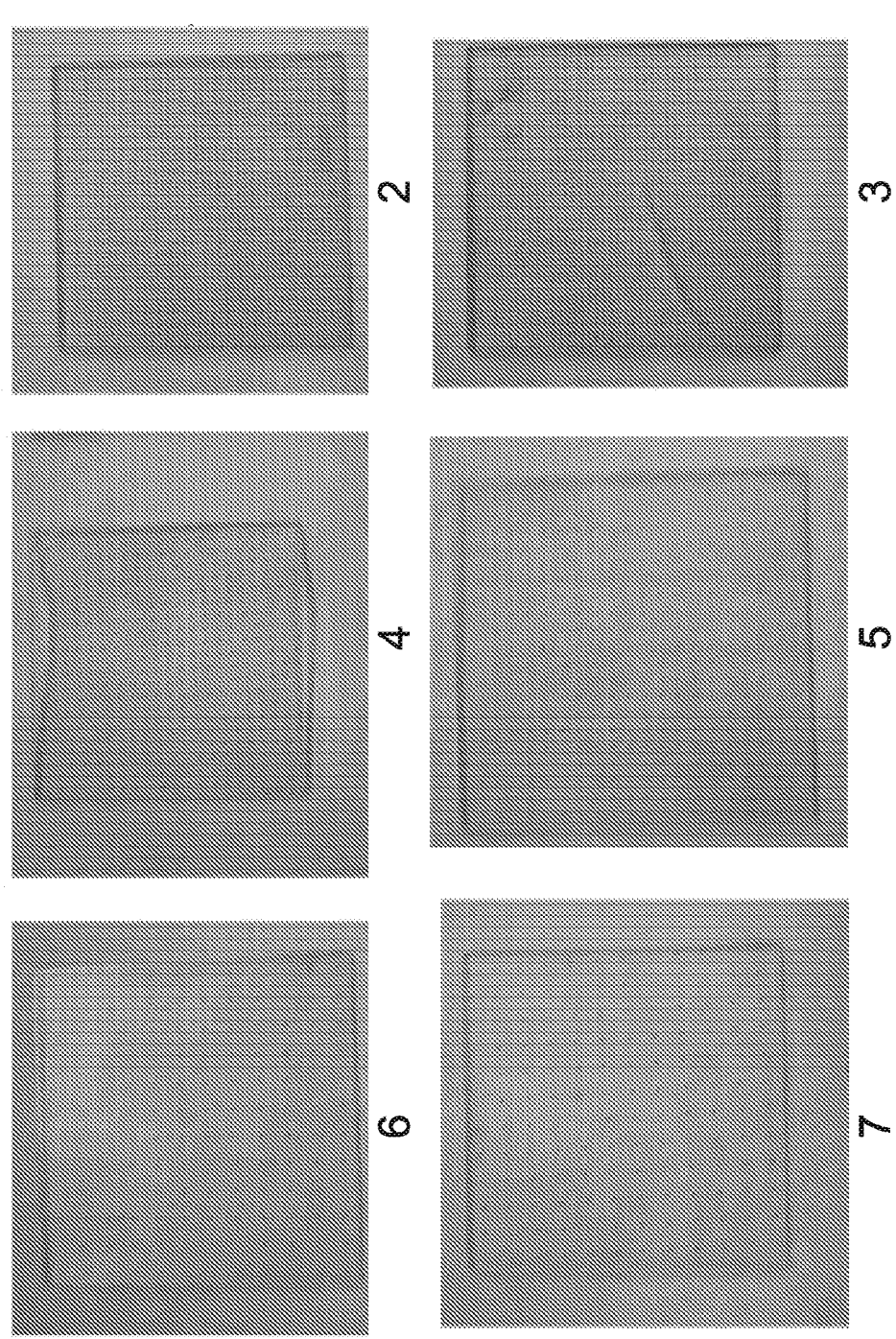
FIG. 12A includes photographs of samples including pixelated structures from Example 5.

A 0.067" (1.7 mm) Digital MAX photopolymer flexographic printing plate (MacDermid Graphics Solutions, Atlanta, GA) imaged with a regular pattern of the inverse of squares (200 micron, 300 micron, and 400 micron squares on 1200 micron pitch) mounted with 3M E1060H Cushion-Mount (3M, St. Paul, MN) flexographic printing tape, and printed with UVF03408-465 UV Easy Release Coating (Flint Group, Plymouth, MI). Photographs of the Samples 1-7 at different coverages are shown in FIG. 12A (Sample 1 was a control sample lacking structures).

The release ink pattern on the foil substrate was then transported through a UV curing station to sufficiently harden the printed ink (i.e., such that it felt hard to the touch and could not be rubbed from the PETG surface). Then the inverse of the printed image on the foil substrate was transferred on to PETG discs (125 mm dia.×0.75 mm thick) in a Carver press at 9000 psi for 1 minute at 250° F.

Tables 2-3 below show the AgO coverage for 25 nm and 50 nm thick AgO, respectively, patterned onto the PETG substrate.

TABLE 2

| AgO Free (Uncoated) Area on 0.75 mm PETG | 25 nm AgO Thickness (300 µm Square × 2100 µm Pitch) | | |
|---|---|---|---|
| (%) | Av T (%) | Av H | Av C |
| 75 | 85.3 | 20.6 | 80.1 |
| 87.5 | 88.2 | 24.6 | 82.8 |
| 93.75 | 89.6 | 21.9 | 88.0 |
| 97 | 90.5 | 21.4 | 89.1 |
| 98 | 90.7 | 17.3 | 86.5 |
| 100 | 92.6 | 0.6 | 99.9 |

TABLE 3

| AgO Free (Uncoated) Area on 0.75 mm PETG | 50 nm AgO Thickness (300 µm Square × 2100 µm Pitch) | | |
|---|---|---|---|
| (%) | Av T (%) | Av H | Av C |
| 75 | 85.7 | 4.1 | 86.8 |
| 87.5 | 88.0 | 7.5 | 89.2 |

TABLE 3-continued

| AgO Free (Uncoated) Area on 0.75 mm PETG | 50 nm AgO Thickness (300 μm Square × 2100 μm Pitch) | | |
|---|---|---|---|
| (%) | Av T (%) | Av H | Av C |
| 93.75 | 89.7 | 5.6 | 90.2 |
| 97 | 90.8 | 9.3 | 90.2 |
| 98 | 91.0 | 5.1 | 91.0 |
| 100 | 92.6 | 0.6 | 99.9 |

Figure 12B:
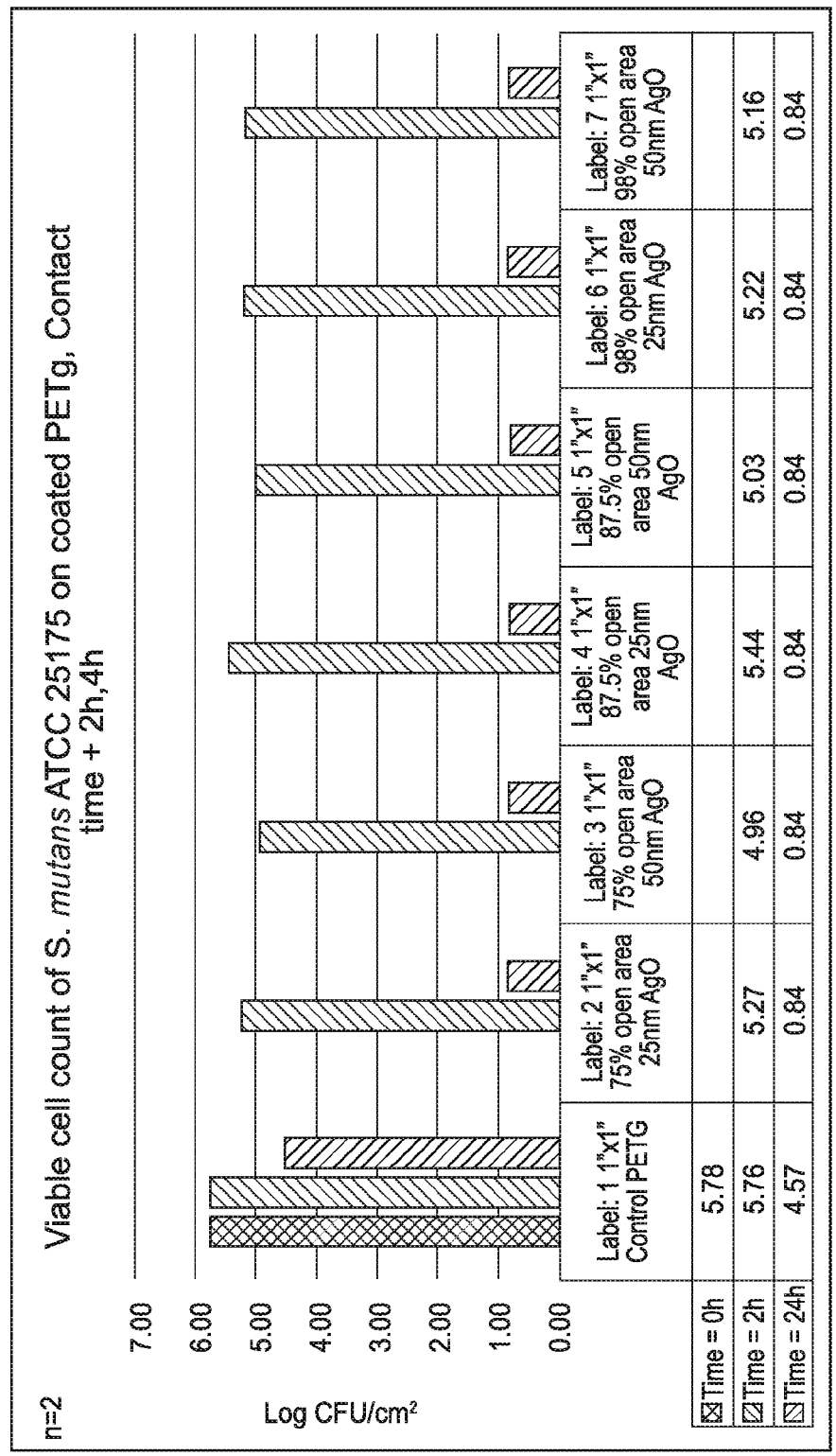
FIG. 12B is a plot showing the antimicrobial properties of the samples of FIG. 12A and Example 5.

As shown in FIG. 12B, for both 25 nm and 50 nm thick pixelated AgO at 75%, 87.5% and 98% open areas, the log (bacterial kill) was about 5 after 24 hours, which indicated that the AgO structures are highly antimicrobial.

The PETG discs with indirectly patterned foil were then thermoformed with a Biostar VI pressure molding/thermoforming machine (Scheu Dental, Great Lakes, Tonawanda, NY) to produce a clear tray aligner (CTA) per UTK-RDTP-11-300071.

All cited references, patents, and patent applications in the above application for letters patent are herein incorporated by reference in their entirety in a consistent manner. In the event of inconsistencies or contradictions between portions of the incorporated references and this application, the information in the preceding description shall control. Various embodiments of the invention have been described. These and other embodiments are within the scope of the following claims.

The invention claimed is:

1. A dental appliance for positioning at least one tooth of a patient, the dental appliance comprising:
a polymeric shell comprising a plurality of cavities for receiving one or more teeth, wherein an interior surface of the polymeric shell comprises a pattern of discrete functional structures, wherein the discrete functional structures comprise a functional layer, and wherein the functional layer comprises a stack of inorganic layers including a layer of silver oxide and a layer of silicon aluminum oxide.

2. The dental appliance of claim 1, wherein the discrete functional structures comprise a plurality of acrylate layers with at least two different thicknesses.

3. The dental appliance of claim 1,
wherein the discrete functional structures have a feature spacing of 100 microns to 2000 microns.

4. The dental appliance of claim 1,
wherein the functional layer further comprises an antimicrobial agent, and wherein the antimicrobial agent is chosen from metal oxide, Ag, and mixtures and combinations thereof.

5. The dental appliance of claim 1,
wherein the dental appliance transmits at least 75% of visible light.

6. The dental appliance of claim 1,
wherein the functional layer is configured to deliver fluoride over a wear time of 7 days.

7. The dental appliance of claim 1, wherein the layer of silicon aluminum oxide has a thickness in a range of 5 nm to 100 nm.

* * * * *